(12) United States Patent
Yamasaki et al.

(10) Patent No.: US 10,270,135 B2
(45) Date of Patent: Apr. 23, 2019

(54) ALL-SOLID-STATE BATTERY

(71) Applicant: TOYOTA JIDOSHA KABUSHIKI KAISHA, Toyota-shi, Aichi-ken (JP)

(72) Inventors: Hisatsugu Yamasaki, Gotenba (JP); Yuki Kato, Susono (JP); Takamasa Ohtomo, Susono (JP); Masatsugu Kawakami, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 413 days.

(21) Appl. No.: 15/022,716

(22) PCT Filed: Sep. 12, 2014

(86) PCT No.: PCT/JP2014/074318
§ 371 (c)(1),
(2) Date: Mar. 17, 2016

(87) PCT Pub. No.: WO2015/045929
PCT Pub. Date: Apr. 2, 2015

(65) Prior Publication Data
US 2016/0233553 A1    Aug. 11, 2016

(30) Foreign Application Priority Data

Sep. 25, 2013   (JP) .................................. 2013-198256
Sep. 25, 2013   (JP) .................................. 2013-198297

(51) Int. Cl.
*H01M 10/0585*   (2010.01)
*H01M 4/13*      (2010.01)
(Continued)

(52) U.S. Cl.
CPC ......... *H01M 10/0585* (2013.01); *H01M 4/13* (2013.01); *H01M 4/366* (2013.01);
(Continued)

(58) Field of Classification Search
CPC ......... H01M 10/0585; H01M 10/0525; H01M 10/0562; H01M 4/13; H01M 4/366; H01M 4/667; H01M 4/525; H01M 4/587
See application file for complete search history.

(56) References Cited

U.S. PATENT DOCUMENTS

2008/0292963 A1   11/2008   Sato et al.
2009/0197182 A1   8/2009    Katoh
(Continued)

FOREIGN PATENT DOCUMENTS

JP   2009-181921 A   8/2009
JP   2009-187682 A   8/2009
(Continued)

*Primary Examiner* — Jimmy Vo
(74) *Attorney, Agent, or Firm* — Oliff PLC

(57) ABSTRACT

An all-solid-state battery that makes it possible to improve the cycling properties is provided. The all-solid-state battery includes an anode; a cathode; a solid electrolyte layer that is arranged between the anode and the cathode; an anode collector that is connected to the anode; and a cathode collector that is connected to the cathode. In the all-solid-state battery, a metal layer is arranged between the anode and the anode collector and/or between the cathode and the cathode collector, and metal that does not undergo an electrochemical reaction with metal ions under a potential environment where an active material stores and releases the metal ions, and whose percent elongation is no less than 22% is used for the metal layer.

5 Claims, 11 Drawing Sheets

(51) Int. Cl.
  *H01M 10/0562* (2010.01)
  *H01M 4/66* (2006.01)
  *H01M 4/36* (2006.01)
  *H01M 10/0525* (2010.01)
  *H01M 4/525* (2010.01)
  *H01M 4/587* (2010.01)

(52) U.S. Cl.
  CPC ....... *H01M 4/667* (2013.01); *H01M 10/0525* (2013.01); *H01M 10/0562* (2013.01); *H01M 4/525* (2013.01); *H01M 4/587* (2013.01)

(56) References Cited

U.S. PATENT DOCUMENTS

| | | | |
|---|---|---|---|
| 2012/0058385 A1 | 3/2012 | Ito et al. | |
| 2012/0244433 A1* | 9/2012 | Yamasaki | H01M 4/0404 |
| | | | 429/211 |
| 2013/0149616 A1 | 6/2013 | Lee et al. | |
| 2013/0157143 A1* | 6/2013 | Hoshiba | H01M 4/621 |
| | | | 429/304 |

FOREIGN PATENT DOCUMENTS

| | | |
|---|---|---|
| JP | 2010-272357 A | 12/2010 |
| JP | 2011-243468 A | 12/2011 |
| JP | 2012-059484 A | 3/2012 |
| JP | 2012-059497 A | 3/2012 |
| JP | 2013-026031 A | 2/2013 |
| JP | 2013-069708 A | 4/2013 |
| JP | 2013-125750 A | 6/2013 |
| KR | 2008-0103447 A | 11/2008 |

* cited by examiner

ALL-SOLID-STATE BATTERY

TECHNICAL FIELD

This invention relates to all-solid-state batteries.

BACKGROUND ART

Metal ion secondary batteries that have solid electrolyte layers using flame-retardant solid electrolytes (for example, lithium-ion secondary batteries and the like. Hereinafter they may be referred to as "all-solid-state batteries") have such merits that systems for securing safety are easy to be simplified.

As to arts relating to lithium-ion secondary batteries, for example, Patent Literature 1 discloses a collector for a nonaqueous solvent secondary battery that includes: a first metal layer; and a second metal layer laminated on the first metal layer; in the collector for a nonaqueous solvent secondary battery, Vickers hardness (HV1, HV2) of each metal that constitutes the first and the second metal layers respectively and the thickness (T1, T2) of each of the first metal layer and the second metal layer satisfy HV1>HV2 and T1<T2, and the combination of the first metal and the second metal is any one of: (first metal, second metal)=(iron, aluminum), (titanium, aluminum), (stainless steel, aluminum), (nickel, copper), (iron, copper), (titanium, copper) and (stainless steel, copper). Patent Literature 2 discloses an electrode body for an all-solid secondary battery that includes a collector and a thin film type active material layer formed on the collector; in the electrode body, Vickers hardness of the collector is lower than that of the active material layer, and is in a range of 400 to 600. Patent Literature 3 discloses a negative electrode for a lithium-ion secondary battery that includes a current collector and a negative electrode active material layer formed on at least one face of the current collector; in the negative electrode, the negative electrode active material layer contains a negative electrode active material capable of storing/releasing lithium ions, and a stress relaxing material. Patent Literature 4 discloses a collector for a lithium-ion secondary battery negative electrode that includes a zinc layer, a copper layer and an indium rust preventive layer which are provided on at least one surface of an aluminum foil in this order.

CITATION LIST

Patent Literature

Patent Literature 1: JP 2013-69708A
Patent Literature 2: JP 2013-26031A
Patent Literature 3: JP 2010-272357A
Patent Literature 4: JP 2012-59484A

SUMMARY OF INVENTION

Technical Problem

It is considered that the arts disclosed in Patent Literatures 1 to 4 make it possible to improve the adhesion of a collector and an active material layer. However, a metal layer and a stress relaxing material, which are used for bringing about such an effect, sometimes store and release metal ions that migrate between positive electrode active materials and negative electrode active materials depending on materials thereof, for example, in a potential range where metal ions are stored in and released from negative electrode active materials (hereinafter the potential range may be referred to as "anode potential"). Occurrence of such a case results in volumetric change because the metal layer and the stress relaxing material expand and shrink. Thus, the adhesion of the collector and the active material layer decreases, and as a result, cycling properties and the coulombic efficiency easily deteriorate.

An object of the present invention is to provide an all-solid-state battery that makes it possible to improve the cycling properties or the coulombic efficiency.

Solution to Problem

The inventors of the present invention found out the following as a result of their intensive studies:

(1) In a case where a soft metal layer is arranged between an anode collector and an anode active material layer (hereinafter referred to as "anode"), the cycling properties can be improved by this metal layer composed of a metal material that does not store and release metal ions migrating between a cathode active material and an anode active material at the anode potential. In a case where a soft metal layer is arranged between a cathode collector and a cathode active material layer (hereinafter referred to as "cathode"), the cycling properties can be improved by the above metal layer composed of a metal material that does not store and release metal ions migrating between a cathode active material and an anode active material in a potential range where metal ions are stored in and released from cathode active materials (hereinafter this potential range may be referred to as "cathode potential").

(2) In a case where a soft metal layer is arranged between an anode collector and an anode, the coulombic efficiency can be improved by arranging another metal layer between this soft metal layer and the anode and by this other metal layer composed of a metal material that does not store and release metal ions migrating between a cathode active material and an anode active material at the anode potential. In a case where a soft metal layer is arranged between a cathode collector and a cathode, the coulombic efficiency can be improved by arranging another metal layer between this soft metal layer and the cathode and by this other metal layer composed of a metal material that does not store and release metal ions migrating between a cathode active material and an anode active material at the cathode potential where metal ions are stored in and released from cathode active materials.

The present invention was completed based on these findings.

The present invention has the following structures in order to solve the above problem. That is:

The first aspect of the present invention is an all-solid-state battery including: an anode that includes an anode active material; a cathode that includes a cathode active material; a solid electrolyte layer that is arranged between the anode and the cathode; an anode collector that is connected to the anode; and a cathode collector that is connected to the cathode, wherein a metal layer is arranged between the anode and the anode collector and/or between the cathode and the cathode collector, in a case where the metal layer is a metal layer that is arranged between the anode and the anode collector (metal layer in an anode side), metal that does not undergo an electrochemical reaction with metal ions under a potential environment where the anode active material stores and releases the metal ions, and whose percent elongation is no less than 22% is used for the metal layer in an anode side, and in a case where the metal layer is a metal layer that is arranged between the cathode and the cathode collector (metal layer in a cathode side), metal that does not undergo an electrochemical reaction with metal ions under a potential environment where the cathode active material stores and releases the metal ions, and whose percent elongation is no less than 22% is used for the metal layer in a cathode side.

In the first aspect of the present invention, the metal used for the metal layer in the anode side does not undergo an electrochemical reaction with the metal ions migrating between the cathode active material and the anode active material at the anode potential. Therefore, the metal layer in the anode side arranged between the anode and the anode collector does not contribute to a charge discharge reaction and thus, volumetric change resulting from charge discharge reactions does not occur. Such a structure makes it possible to keep the state where the adhesion of the anode and the anode collector is improved and thus, to improve the cycling properties. The metal used for the metal layer in the cathode side does not undergo an electrochemical reaction with the metal ions migrating between the cathode active material and the anode active material at the cathode potential. Therefore, the metal layer in the cathode side arranged between the cathode and the cathode collector does not contribute to a charge discharge reaction and thus, volumetric change resulting from charge discharge reactions does not occur. Such a state makes it possible to keep the state where the adhesion of the cathode and the cathode collector is improved and thus, to improve the cycling properties. Such an effect can be brought about either by the structure of making the metal layer intervene only between the anode and the anode collector or by the structure of making the metal layer intervene only between the cathode and the cathode collector. A larger effect can be brought about by the structure of making the metal layer intervene between the anode and the anode collector and making the metal layer intervene between the cathode and the cathode collector.

The second aspect of the present invention is an all-solid-state battery including: an anode that includes an anode active material; a cathode that includes a cathode active material; a solid electrolyte layer that is arranged between the anode and the cathode; an anode collector that is connected to the anode; and a cathode collector that is connected to the cathode, wherein a metal layer is arranged between the anode and the anode collector and/or between the cathode and the cathode collector, in a case where the metal layer is a metal layer that is arranged between the anode and the anode collector (metal layer in an anode side), the metal layer in an anode side contains metal whose percent elongation is no less than 22%, and an inert metal layer in an anode side is arranged between the metal layer in an anode side and the anode, metal that does not undergo an electrochemical reaction with metal ions under a potential environment where the anode active material stores and releases the metal ions is used for the inert metal layer in an anode side, in a case where the metal layer is a metal layer that is arranged between the cathode and the cathode collector (metal layer in a cathode side), the metal layer in a cathode side contains the metal whose percent elongation is no less than 22%, and an inert metal layer in a cathode side is arranged between the metal layer in a cathode side and the cathode, and metal that does not undergo an electrochemical reaction with metal ions under a potential environment where the cathode active material stores and releases the metal ions is used for the inert metal layer in a cathode side.

In the second aspect of the present invention, the metal used for the inert metal layer in the anode side does not undergo an electrochemical reaction with the metal ions migrating between the cathode active material and the anode active material at the anode potential. Therefore, the inert metal layer in the anode side does not contribute to a charge discharge reaction and thus, the irreversible capacity can be prevented from increasing and also, volumetric change resulting from charge discharge reactions can be held down. As a result, the coulombic efficiency can be improved. The metal used for the inert metal layer in the cathode side does not undergo an electrochemical reaction with the metal ions migrating between the anode active material and the cathode active material at the cathode potential. Therefore, the inert metal layer in the cathode side does not contribute to a charge discharge reaction and thus, the irreversible capacity can be prevented from increasing and also, volumetric change resulting from charge discharge reactions can be held down. As a result, the coulombic efficiency can be improved. Such an effect can be brought about either by the structure of making the metal layer in the anode side and the inert metal layer in the anode side intervene only between the anode and the anode collector or by the structure of making the metal layer in the cathode side and the inert metal layer in the cathode side intervene only between the cathode and the cathode collector. A larger effect can be brought about by the structure of making the metal layer in the anode side and the inert metal layer in the anode side intervene between the anode and the anode collector and making the metal layer in the cathode side and the inert metal layer in the cathode side intervene between the cathode and the cathode collector.

In the first and second aspects of the present invention, in a case where the metal layer is arranged between the anode and the anode collector, this metal layer is referred to as "metal layer in the anode side". In a case where the metal layer is arranged between the cathode and the cathode collector, this metal layer is referred to as "metal layer in the cathode side". "Metal ions" are metal ions that migrate between the anode active material and the cathode active material when the all-solid-state battery operates. "Potential environment where the anode active material stores and releases the metal ions" means, more specifically: the potential range of the potential where the anode active material starts occluding the metal ions and the potential where the anode active material does not store the metal ions anymore; or the potential range of the potential where the anode active material starts releasing the metal ions and the potential where the anode active material does not release the metal ions anymore. Here, it is because the former potential range sometimes does not exactly match the latter potential range in the anode active material (in a case of exhibiting a predetermined hysteresis) that the potential range where the anode active material stores the metal ions are linked with the potential range where the anode active material releases the metal ions by "or". "Potential environment where the cathode active material stores and releases the metal ions" means, more specifically: the potential range of the potential where the cathode active material starts occluding the metal ions and the potential where the cathode active material does not store the metal ions anymore; or the potential range of the potential where the cathode active material starts releasing the metal ions and the potential where the cathode active material does not release the metal ions anymore. Here, it is because the former potential range sometimes does not exactly match the latter potential range in the cathode active material (in a case of exhibiting a predetermined hysteresis) that the potential range where the cathode active material stores the metal ions are linked with the potential range where the cathode active material releases the metal ions by "or". As to "percent elongation" of the metal, "The Japan Institute of Metals and Materials-hen, *Kinzoku deta bukku*, Maruzen Company, Limited, Kaitei 3-ban" may be referred to.

Advantageous Effects of Invention

According to the present invention, an all-solid-state battery that makes it possible to improve the cycling properties or the coulombic efficiency can be provided.

DESCRIPTION OF EMBODIMENTS

The present invention will be explained with reference to the drawings hereinafter. The following embodiments are exemplifications of the present invention, and the present invention is not limited thereto.

1. First Embodiment 1.1. All-Solid-State Battery 10

Figure 1:
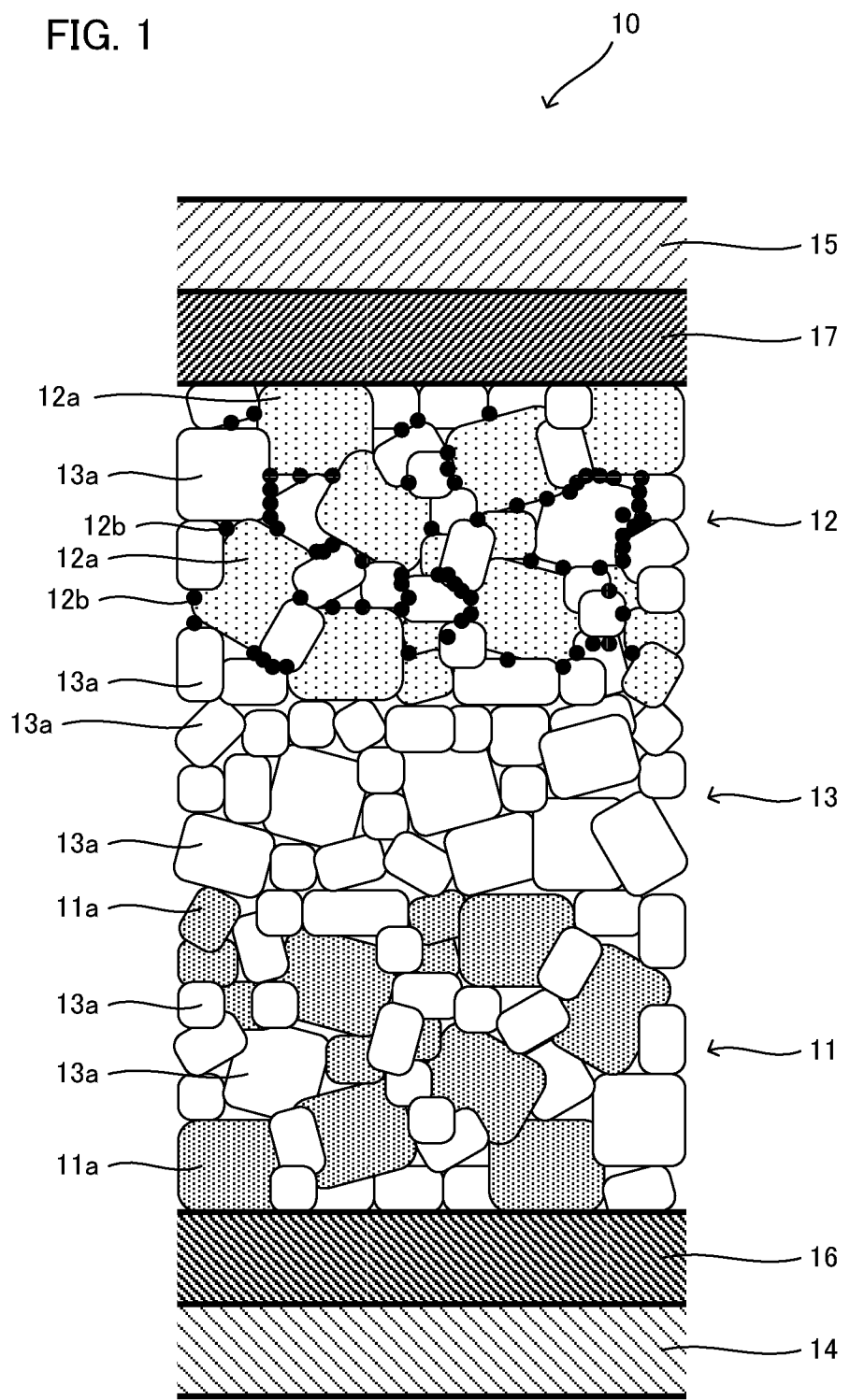
FIG. 1 is a view to explain an example of a structure of an all-solid-state battery of the present invention according to the first embodiment.

FIG. 1 depicts an all-solid-state battery 10 corresponding to the first embodiment of the present invention. The all-solid-state battery 10 depicted in FIG. 1 includes an anode 11, a cathode 12, a solid electrolyte layer 13 arranged between the anode 11 and cathode 12, an anode collector 14 connected to the anode 11, a cathode collector 15 connected to the cathode 12, a metal layer in the anode side 16 arranged between the anode 11 and the anode collector 14 and a metal layer in the cathode side 17 arranged between the cathode 12 and the cathode collector 15. The anode 11 includes an anode active material 11$a$ and a sulfide solid electrolyte 13$a$. The cathode 12 includes a cathode active material 12$a$, a sulfide solid electrolyte 13$a$ and a conductive additive 12$b$. The solid electrolyte layer 13 includes the sulfide solid electrolyte 13$a$. In the all-solid-state battery 10, the anode active material 11$a$ is graphite, the cathode active material 12$a$ is $LiNi_{1/3}Co_{1/3}Mn_{1/3}O_2$, the metal layer in the anode side 16 is Li foil, and the metal layer in the cathode side 17 is In foil.

Here, the anode active material 11$a$, which is graphite, starts occluding and releasing lithium ions at approximately 2.5 V, which is higher than 0.6 V, with respect to Li (vs $Li^+/Li$. Hereinafter the same will be applied), and does not store and release lithium ions anymore at any potential between 0.1 V and 0 V, with respect to Li. The average potential where graphite stores and releases lithium ions is approximately 0.1 V, with respect to Li.

The cathode active material 12$a$, which is $LiNi_{1/3}Co_{1/3}Mn_{1/3}O_2$, starts occluding and releasing lithium ions at the potential of approximately 4 to 5 V, with respect to Li, and does not store and release lithium ions any more at the potential of approximately 1 to 2 V, with respect to Li. The average potential where $LiNi_{1/3}Co_{1/3}Mn_{1/3}O_2$ stores and releases lithium ions is approximately 3.8 V, with respect to Li.

The potential where metallic Li is ionized to be lithium ions and where lithium ions are deionized to be metallic Li is 0 V, with respect to Li, and the average potential where metallic In stores and releases lithium ions is approximately 0.6 V, with respect to Li.

Li constituting the metal layer in the anode side 16 in the all-solid-state battery 10 does not undergo an electrochemical reaction with lithium ions under the potential environment (at the anode potential) where the anode active material 11$a$ stores and releases the lithium ions migrating between the anode active material 11$a$ and the cathode active material 12$a$. Thus, because the metal layer in the anode side 16 does not store and release the lithium ions even if the all-solid-state battery 10 is operated, no volumetric change accompanied with the occlusion and release of the lithium ions occurs in the metal layer in the anode side 16 itself. The percent elongation of Li foil is more than 22%. Thus, the all-solid-state battery 10 makes it possible to keep the anode 11 and the anode collector 14 adhering to each other for a long time via the metal layer in the anode side 16.

In constituting the metal layer in the cathode side 17 in the all-solid-state battery 10 does not undergo an electrochemical reaction with lithium ions under the potential environment (at the cathode potential) where the cathode active material 12$a$ stores and releases the lithium ions. Thus, because the metal layer in the cathode side 17 does not store and release the lithium ions even if the all-solid-state battery 10 is operated, no volumetric change accompanied with the occlusion and release of the lithium ions occurs in the metal layer in the cathode side 17 itself. The percent elongation of In foil is 22%. Thus, the all-solid-state battery 10 makes it possible to keep the cathode 12 and the cathode collector 15 adhering to each other for a long time via the metal layer in the cathode side 17.

As described above, the all-solid-state battery 10 makes it possible to keep the anode 11 and the anode collector 14 adhering to each other for a long time via the metal layer in the anode side 16, and makes it possible to keep the cathode 12 and the cathode collector 15 adhering to each other for a long time via the metal layer in the cathode side 17. The cycling properties can be improved by the adhesion of the anode 11 and the anode collector 14 to each other for a long time and the adhesion of the cathode 12 and the cathode collector 15 to each other for a long time.

The anode 11 can be made through a process of, for example, pressing an anode mixture that is obtained by mixing the anode active materials 11$a$ and the sulfide solid electrolytes 13*a* at the predetermined ratio (weight ratio). The cathode 12 can be made through a process of, for example, pressing a cathode mixture that is obtained by mixing the cathode active materials 12*a*, the conductive additives 12*b* and the sulfide solid electrolytes 13*a* at the predetermined ratio (weight ratio). The solid electrolyte layer 13 can be made through a process of, for example, pressing the sulfide solid electrolytes 13*a*. After the anode 11, the cathode 12 and the solid electrolyte layer 13 are made as described above, as depicted in FIG. 1, the anode collector 14, the metal layer in the anode side 16, the anode 11, the solid electrolyte layer 13, the cathode 12, the metal layer in the cathode side 17 and the cathode collector 15 are layered under an inert atmosphere (for example, an argon atmosphere, a nitrogen atmosphere or a helium atmosphere) so that they are arranged in this order from one side to the other side, to form a layered body. After that, the all-solid-state battery 10 can be made through a process of, for example, pressing the layered body. When the all-solid-state battery 10 is made, there is especially no limitation in the anode 11, the cathode 12 and the solid electrolyte layer 13 in form. For example, when the all-solid-state battery 10 of small resistance is made, the solid electrolyte layer 13 can be thin. When the all-solid-state battery 10 of high energy density is made, the anode 11 and the cathode 12 can be thick. When the all-solid-state battery 10 of high power density is made, the anode 11 and the cathode 12 can be thin.

Figure 2:
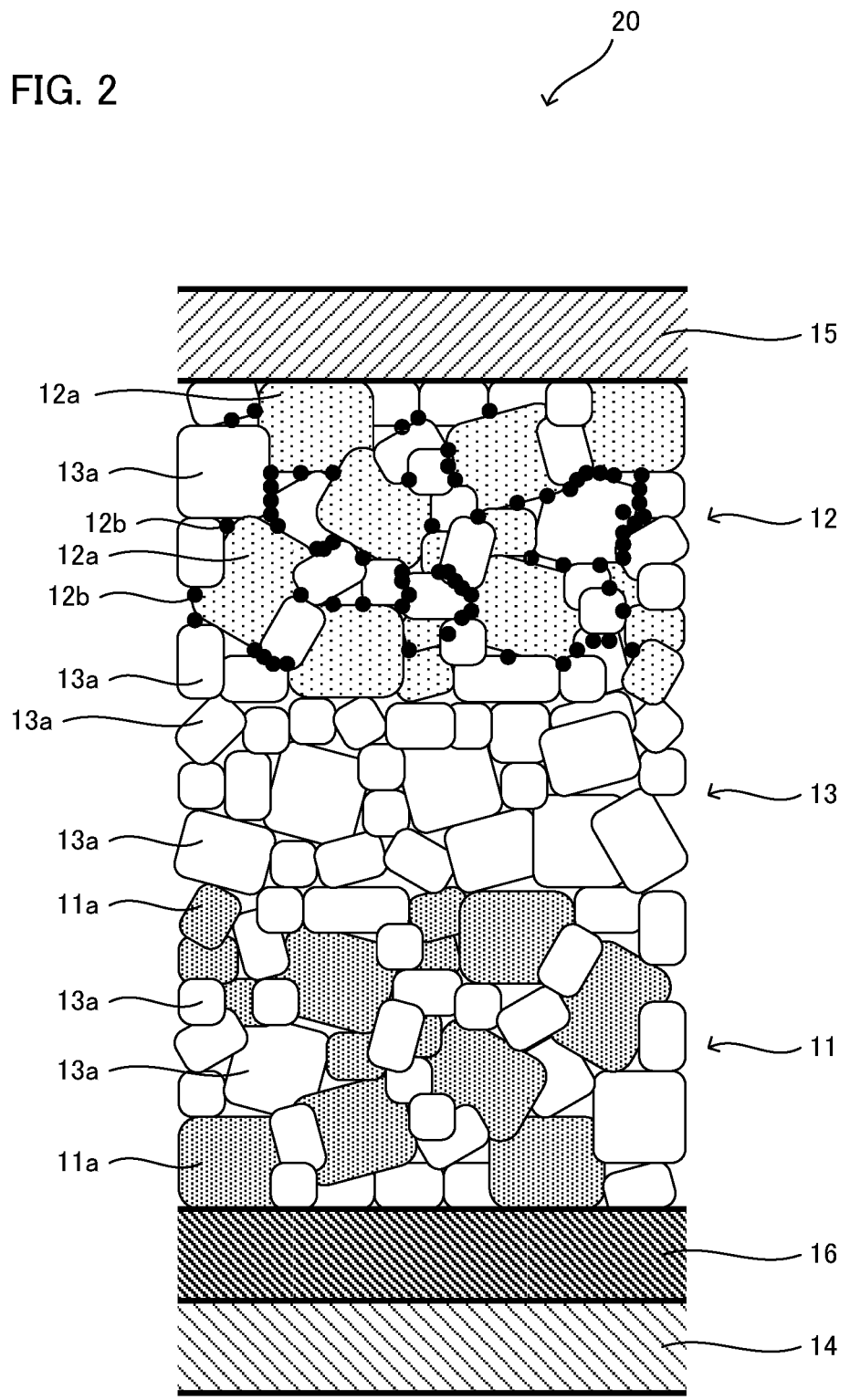
FIG. 2 is a view to explain an example of another structure of the all-solid-state battery of the present invention according to the first embodiment.
Figure 3:
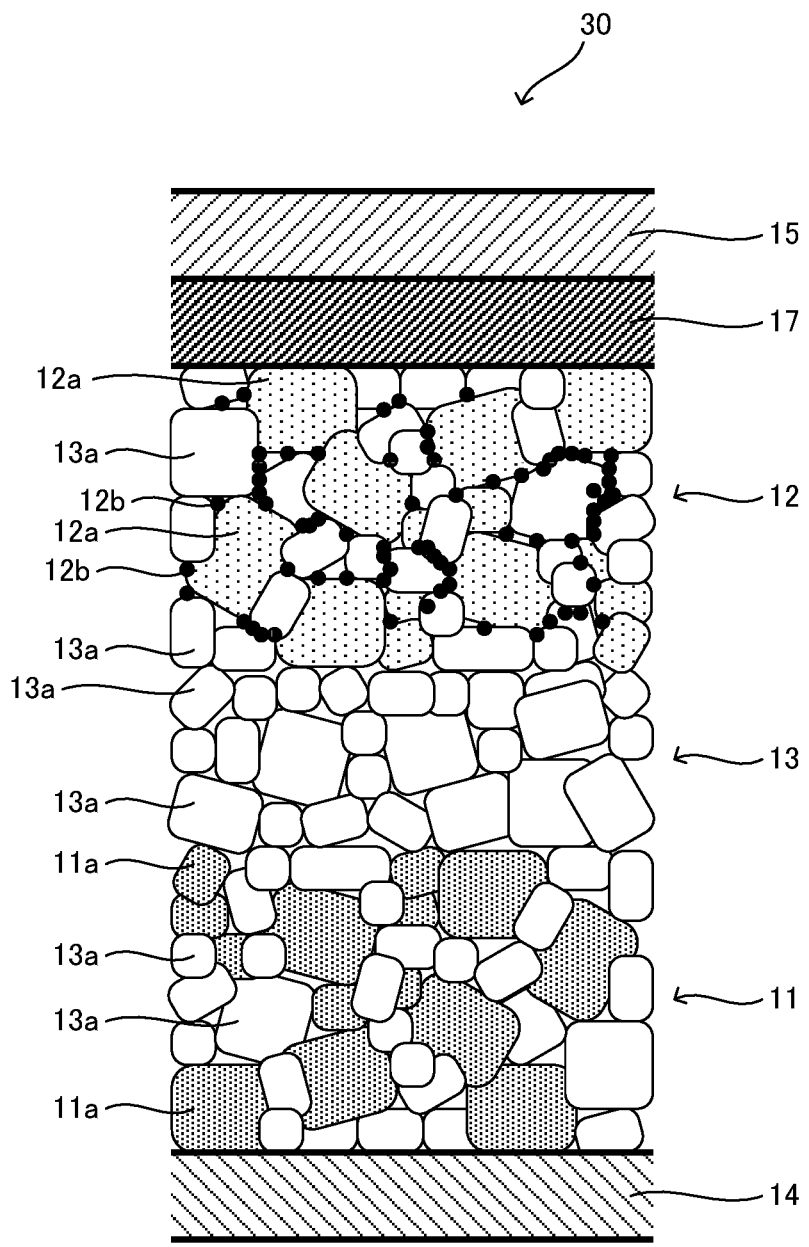
FIG. 3 is a view to explain an example of still another structure of the all-solid-state battery of the present invention according to the first embodiment.

While the above description relating to the all-solid-state battery 10 illustrates the structure of including the metal layer in the anode side 16 and the metal layer in the cathode side 17, the all-solid-state battery of the present invention according to the first embodiment is not limited to this structure. The all-solid-state battery can have the structure of including the metal layer in the anode side without the metal layer in the cathode side. In addition, the all-solid-state battery can have the structure of including the metal layer in the cathode side without the metal layer in the anode side. FIGS. 2 and 3 depict the all-solid-state batteries of these structures.

1.2. All-Solid-State Battery 20

An all-solid-state battery 20 depicted in FIG. 2 is configured as the all-solid-state battery 10 except that the metal layer in the cathode side 17 is not included therein. That is, the all-solid-state battery 20 includes the anode 11, the cathode 12, the solid electrolyte layer 13 arranged between the anode 11 and cathode 12, the anode collector 14 connected to the anode 11, the cathode collector 15 connected to the cathode 12, and the metal layer in the anode side 16 arranged between the anode 11 and the anode collector 14. The anode 11 includes the anode active material 11*a* and the sulfide solid electrolyte 13*a*. The cathode 12 includes the cathode active material 12*a*, the sulfide solid electrolyte 13*a* and the conductive additive 12*b*. The solid electrolyte layer 13 includes the sulfide solid electrolyte 13*a*. In the all-solid-state battery 20, the anode active material 11*a* is graphite, the cathode active material 12*a* is $LiNi_{1/3}Co_{1/3}Mn_{1/3}O_2$, and the metal layer in the anode side 16 is Li foil.

In the all-solid-state battery 20, Li constituting the metal layer in the anode side 16 does not undergo an electrochemical reaction with lithium ions under the potential environment (at the anode potential) where the anode active material 11*a* stores and releases the lithium ions migrating between the anode active material 11*a* and the cathode active material 12*a*. Thus, because the metal layer in the anode side 16 does not store and release the lithium ions even if the all-solid-state battery 20 is operated, no volumetric change accompanied with the occlusion and release of the lithium ions occurs in the metal layer in the anode side 16 itself. The percent elongation of Li foil is more than 22%. Thus, the all-solid-state battery 20 makes it possible to keep the anode 11 and the anode collector 14 adhering to each other for a long time via the metal layer in the anode side 16 and then, makes it possible to improve the cycling properties.

1.3. All-Solid-State Battery 30

An all-solid-state battery 30 depicted in FIG. 3 is configured as the all-solid-state battery 10 except that the metal layer in the anode side 16 is not included therein. That is, the all-solid-state battery 30 includes the anode 11, the cathode 12, the solid electrolyte layer 13 arranged between the anode 11 and cathode 12, the anode collector 14 connected to the anode 11, the cathode collector 15 connected to the cathode 12, and the metal layer in the cathode side 17 arranged between the cathode 12 and the cathode collector 15. The anode 11 includes the anode active material 11*a* and the sulfide solid electrolyte 13*a*. The cathode 12 includes the cathode active material 12*a*, the sulfide solid electrolyte 13*a* and the conductive additive 12*b*. The solid electrolyte layer 13 includes the sulfide solid electrolyte 13*a*. In the all-solid-state battery 10, the anode active material 11*a* is graphite, the cathode active material 12*a* is $LiNi_{1/3}Co_{1/3}Mn_{1/3}O_2$, and the metal layer in the cathode side 17 is In foil.

In the all-solid-state battery 30, In constituting the metal layer in the cathode side 17 does not undergo an electrochemical reaction with lithium ions under the potential environment (at the cathode potential) where the cathode active material 12*a* stores and releases the lithium ions. Thus, because the metal layer in the cathode side 17 does not store and release the lithium ions even if the all-solid-state battery 30 is operated, no volumetric change accompanied with the occlusion and release of the lithium ions occurs in the metal layer in the cathode side 17 itself. The percent elongation of In foil is 22%. Thus, the all-solid-state battery 30 makes it possible to keep the cathode 12 and the cathode collector 15 adhering to each other for a long time via the metal layer in the cathode side 17 and then, makes it possible to improve the cycling properties.

As described above, the structure of having one selected from the metal layer in the anode side and the metal layer in the cathode side also makes it possible to improve the cycling properties. However, it is preferable that the all-solid-state battery of the present invention according to the first embodiment has the structure of including the metal layer in the anode side and the metal layer in the cathode side because it is considered to be effective to keep the adhesion of the anode and the anode collector to each other and the adhesion of the cathode and the cathode collector to each other for a long time in view of making the all-solid-state battery have the structure of easily improving the cycling properties.

1.4. Anode 1.4.1. Anode Active Material

In the present invention according to the first embodiment, a known anode active material that can store and release lithium ions can be properly used as the anode active material contained in the anode. Examples of such an anode active material include a carbon active material, an oxide active material and a metal active material. A carbon active material is not especially limited as long as containing carbon, and examples thereof include natural graphite, a mesocarbon microbead (MCMB), highly oriented pyrolytic graphite (HOPG), hard carbon and soft carbon. Examples of an oxide active material include $Nb_2O_5$, $Li_4Ti_5O_{12}$ and SiO. Examples of a metal active material include In, Al, Si and Sn. A lithium containing metal active material may be used as an anode active material. A lithium containing metal active material is not especially limited as long as the active material contains at least Li, and may be Li metal, or may be Li alloy. Examples of Li alloy include alloy containing Li and at least one kind selected from the group consisting of In, Al, Si and Sn. The shape of the anode active material can be, for example, a particle or a film. The average particle diameter of the anode active material ($D_{50}$) is preferably 1 nm to 100 µm, for example, and more preferably 10 nm to 30 µm. While not especially limited, the content of the anode active materials in the anode is preferably 40% by mass to 99% by mass, for example.

1.4.2. Solid Electrolyte

In the present invention according to the first embodiment, a known solid electrolyte that is usable for all-solid-state batteries can be contained as needed in not only the solid electrolyte layer described later but also the anode. In a case where the solid electrolyte is contained in the anode, a solid electrolyte that is not resolved at the anode potential can be contained in the anode. In a case where the solid electrolyte is contained in the cathode, a solid electrolyte that is not resolved at the cathode potential can be contained in the cathode. Examples of a solid electrolyte that can be contained in the anode and the cathode include $Li_2O$—$B_2O_3$—$P_2O_5$, $Li_2O$—$SiO_2$, $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1) and $Li_{3.6}Si_{0.6}P_{0.4}O_4$. However, it is preferable that a sulfide solid electrolyte is used for the solid electrolyte in view of making the all-solid-state battery have the structure of easily improving its performance or the like. A method for manufacturing the solid electrolyte used for the all-solid-state battery of the present invention according to the first embodiment is not especially limited, and a solid electrolyte manufactured by a known manufacturing method can be properly used. For example, starting materials when the solid electrolyte is synthesized are not especially limited. Can be properly used in a method for synthesizing the solid electrolyte are a dry ball mill process, a wet ball mill process with a solvent such as heptane, and other mechanochemical processes that make a chemical reaction progress with application of mechanical energy. The solid electrolyte may be amorphous or may be a crystal.

1.4.3. Other Anode Materials

The anode may contain a binder that binds the anode active material and the solid electrolyte, and a conductive additive that improves conductivity. A known binder that can be contained in anodes of lithium-ion secondary batteries can be properly used for the anode. Specifically, acrylonitrile-butadiene rubber (ABR), butadiene rubber (BR), polyvinylidene difluoride (PVdF), styrene-butadiene rubber (SBR) or the like can be used. A known conductive additive that can be contained in anodes of lithium-ion secondary batteries can be properly used for the anode. Examples of a conductive additive that can be contained in the anode include a carbon material such as a vapor grown carbon fiber, acetylene black (AB), Ketjenblack (KB), a carbon nanotube (CNT) and a carbon nanofiber (CNF), and a metal material that can withstand the environment where the all-solid-state battery is used. For example, in a case where the anode is made using a slurry anode composition prepared by dispersing the above anode active material, solid electrolyte, conductive additive, binder, etc. over liquid, examples of usable liquid include heptane and the like, and preferably a nonpolar solvent can be used. The thickness of the anode is, for example, preferably 0.1 µm to 1 mm, and more preferably 1 µm to 100 µm. It is also preferable that the anode is made through the process of pressing in order to easily improve the performance of the all-solid-state battery. In the present invention according to the first embodiment, pressure when the anode is pressed is preferably no less than 200 MPa, and more preferably, approximately 400 MPa.

1.5. Cathode 1.5.1. Cathode Active Material

In the present invention according to the first embodiment, a cathode active material that is usable for all-solid-state batteries can be properly used as the cathode active material contained in the cathode. Examples of such a cathode active material include $LiNi_{1/3}Co_{1/3}Mn_{1/3}O_2$, $LiCoO_2$, $LiNiO_2$, $LiFePO_4$ and $LiMn_2O_4$. The shape of the cathode active material can be, for example, a particle or a film. The average particle diameter of the cathode active material ($D_{50}$) is preferably 1 nm to 100 µm, for example, and more preferably 10 nm to 30 µm. While not especially limited, the content of the cathode active materials in the cathode layer is preferably 40% by mass to 99% by mass, for example.

1.5.2. Solid Electrolyte Layer

A solid electrolyte can be contained as needed in the cathode as well. Examples of a solid electrolyte that can be contained in the cathode include the above described solid electrolytes that can be contained in the anode.

1.5.3. Layer that Covers Cathode Active Material

When a sulfide solid electrolyte is used as the solid electrolyte, it is preferable that the cathode active material is covered with an ion conducting oxide in view of making a high resistive layer difficult to be formed in an interface between the cathode active material and the solid electrolyte, to make the all-solid-state battery have the structure of easily preventing the battery resistance from increasing. Examples of a lithium ion conducting oxide that covers the cathode active material include oxides represented by the general formula $Li_xAO_y$ (A represents B, C, Al, Si, P, S, Ti, Zr, Nb, Mo, Ta or W; x and y represent positive numbers). Examples thereof specifically include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. A lithium ion conducting oxide may be a composite oxide. Any combination of the above lithium ion conducting oxides can be employed as the composite oxide that covers the cathode active material. Examples thereof include $Li_4SiO_4$—$Li_3BO_3$ and $Li_4SiO_4$—$Li_3PO_4$. When the surface of the cathode active material is covered with an ion conducting oxide, this ion conducting oxide may cover either at least part of the cathode active material, or the entire surface of the cathode active material. A method for covering the surface of the cathode active material with an ion conducting oxide is not especially limited. The surface of the cathode active material can be covered with an ion conducting oxide using a known method. The thickness of the ion conducting oxide that covers the cathode active material is, for example, preferably 0.1 nm to 100 nm, and more preferably 1 nm to 20 nm. The thickness of the ion conducting oxide can be measured with, for example, a transmission electron microscope (TEM).

1.5.4. Other Cathode Materials

A known binder that can be contained in cathode layers of lithium-ion secondary batteries can be used for the cathode. Examples of such a binder include the above binders that can be contained in the anode. Further, the cathode may contain a conductive additive that improves conductivity. Examples of a conductive additive that can be contained in the cathode include the above conductive additives that can be contained in the anode. For example, in a case where the cathode is made using a slurry cathode composition prepared by dispersing the above cathode active material, solid electrolyte, conductive additive, binder, etc. over liquid, examples of usable liquid include heptane and the like, and preferably a nonpolar solvent can be used. The thickness of the cathode is, for example, preferably 0.1 μm to 1 mm, and more preferably 1 μm to 100 μm. It is also preferable that the cathode is made through the process of pressing in order to easily improve the performance of the all-solid-state battery. In the present invention according to the first embodiment, pressure when the cathode is pressed can be approximately 100 MPa.

1.6. Solid Electrolyte Layer

A known solid electrolyte that is usable to all-solid-state batteries can be properly used as the solid electrolyte contained in the solid electrolyte layer. Examples of such a solid electrolyte include the above solid electrolytes that can be contained in the cathode and the anode. Other than this, a binder that binds the solid electrolytes to each other can be contained in the solid electrolyte layer in view of making plasticity appear and so on. Examples of such a binder include the above binders that can be contained in the anode. It is preferable that the binder contained in the solid electrolyte layer is no more than 5% by mass in view of making it possible to form the solid electrolyte layer including uniformly dispersing solid electrolytes that are prevented from excessive aggregation and so on in order to easily achieve high power. In a case where the solid electrolyte layer is made through the process of applying, to the base material, a slurry solid electrolyte composition that is prepared by dispersing the above solid electrolyte or the like over the liquid, examples of liquid over which the solid electrolyte or the like is dispersed include heptane, and preferably a nonpolar solvent can be used. The content of a solid electrolyte material in the solid electrolyte layer is, for example, no less than 60% by mass. Preferably, it is no less than 70% by mass, and especially preferably, it is no less than 80% by mass. The thickness of the solid electrolyte layer largely varies depending on the composition of the battery. For example, it is preferably 0.1 μm to 1 mm, and more preferably, 1 μm to 100 μm.

1.7. Anode Collector and Cathode Collector

Known metal that is usable for collectors of all-solid-state batteries can be used for the anode collector and the cathode collector. Examples of such metal include a metal material containing at least one element selected from the group consisting of Cu, Ni, Al, V, Au, Pt, Mg, Fe, Ti, Co, Cr, Zn, Ge and In.

1.8. Metal Layer in Anode Side

Metal that does not undergo an electrochemical reaction with metal ions at the anode potential, and whose percent elongation is no less than 22% can be used for the metal layer in the anode side. Such metal can be selected according to the anode active material. For example, if the anode active material is graphite, examples of metal usable for the metal layer in the anode side include Li, Cu, Au, Ti, Fe, Nb and Ni. In addition, for example, if the anode active material is $Li_4Ti_5O_{12}$, examples of metal usable for the metal layer in the anode side include Li, Cu, Au, Ti, Fe, Nb, Ni, In, Zn, Al, Ca, Ag, Zr, Sn and Pt.

1.9. Metal Layer in Cathode Side

Metal that does not undergo an electrochemical reaction with metal ions at the cathode potential, and whose percent elongation is no less than 22% can be used for the metal layer in the cathode side. Such metal can be selected according to the cathode active material. For example, if the cathode active material is $LiCoO_2$ or $LiNi_{1/3}Co_{1/3}Mn_{1/3}O_2$, examples of metal usable for the metal layer in the cathode side include Li, In, Zn, Al, Ca, Zr, Sn, W, Ti, Fe, Nb, Ni, V, Pd, Mn and Mo.

2. Second Embodiment 2.1. All-Solid-State Battery 110

Figure 4:
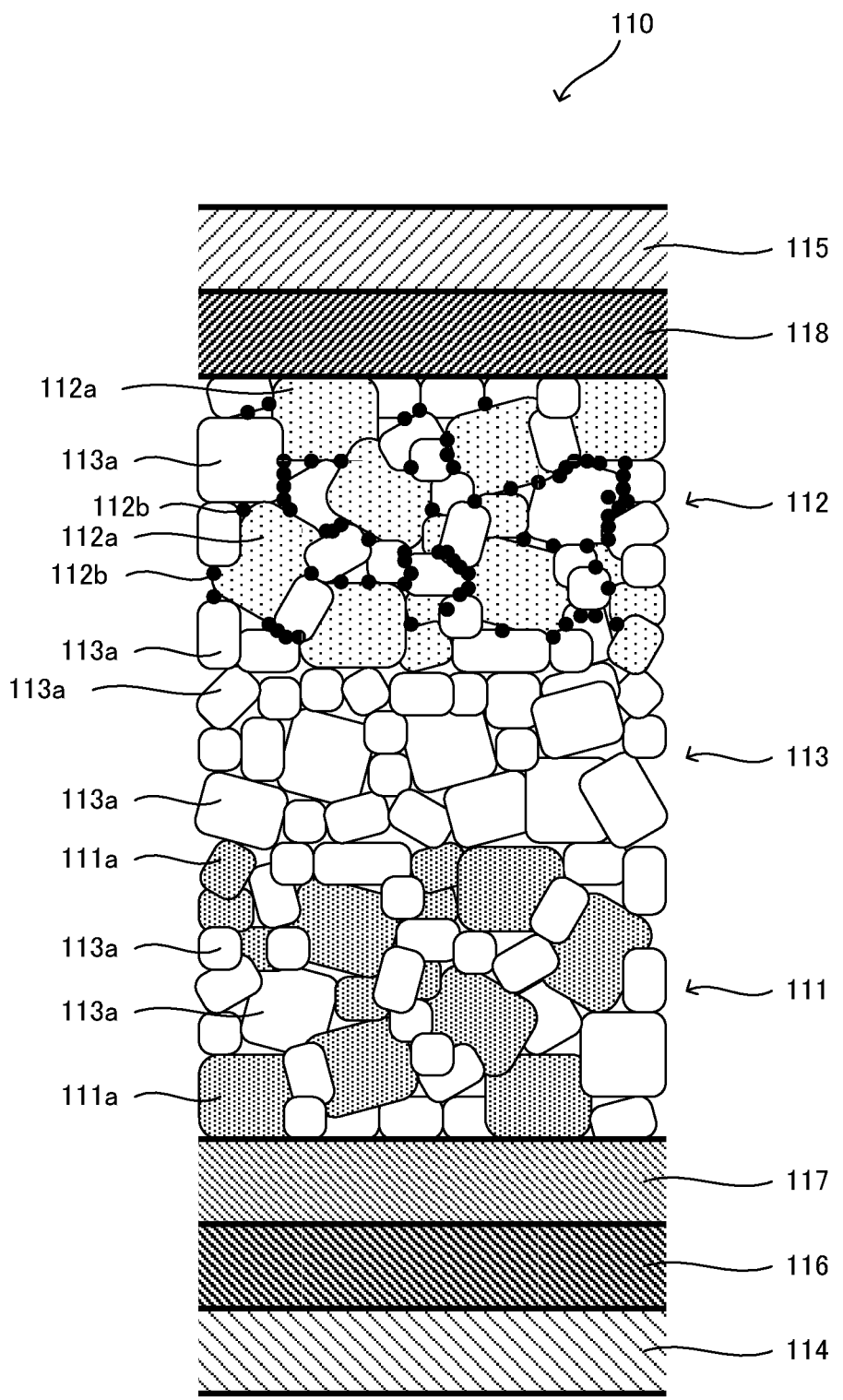
FIG. 4 is a view to explain an example of a structure of an all-solid-state battery of the present invention according to the second embodiment.

FIG. 4 depicts an all-solid-state battery 110 corresponding to the second embodiment of the present invention. The all-solid-state battery 110 depicted in FIG. 4 includes an anode 111, a cathode 112, a solid electrolyte layer 113 arranged between the anode 111 and cathode 112, an anode collector 114 connected to the anode 111, a cathode collector 115 connected to the cathode 112, a metal layer in the anode side 116 arranged between the anode 111 and the anode collector 114, an inert metal layer in the anode side 117 arranged between the metal layer in the anode side 116 and the anode 111, and a metal layer in the cathode side 118 arranged between the cathode 112 and the cathode collector 115. The anode 111 includes an anode active material 111a and a sulfide solid electrolyte 113a. The cathode 112 includes a cathode active material 112a, a sulfide solid electrolyte 113a and a conductive additive 112b. The solid electrolyte layer 113 includes the sulfide solid electrolyte 113a. In the all-solid-state battery 110, the anode active material 111a is graphite, the cathode active material 112a is $LiNi_{1/3}Co_{1/3}Mn_{1/3}O_2$, the metal layer in the anode side 116 is In foil, the inert metal layer in the anode side 117 is Cu foil, and the metal layer in the cathode side 118 is In foil.

Here, the anode active material 111a, which is graphite, starts occluding and releasing lithium ions at approximately 2.5 V, which is higher than 0.6 V, with respect to Li (vs $Li^+/Li$. Hereinafter the same will be applied), and does not store and release lithium ions anymore at any potential between 0.1 V and 0 V, with respect to Li. The average potential where graphite stores and releases lithium ions is approximately 0.1 V, with respect to Li.

The cathode active material 112a, which is $LiNi_{1R}Co_{1/3}Mn_{1/3}O_2$, starts occluding and releasing lithium ions at the potential of approximately 4 to 5 V, with respect to Li, and does not store and release lithium ions anymore at the potential of approximately 1 to 2V, with respect to Li. The average potentials where $LiNi_{1/3}Co_{1/3}Mn_{1/3}O_2$ stores and where $LiNi_{1/3}Co_{1/3}Mn_{1/3}O_2$ releases lithium ions are approximately 3.8 V, with respect to Li.

Metallic Cu is electrochemically inert because hardly alloying lithium. The average potential where metallic In stores and releases lithium ions is approximately 0.6 V, with respect to Li.

In constituting the metal layer in the anode side 116 is soft metal, and its percent elongation is 22%. Thus, arrangement of the metal layer in the anode side 116 between the anode 111 and the anode collector 114 makes it possible to improve the adhesion of the anode 111 and the anode collector 114. Cu constituting the inert metal layer in the anode side 117 does not undergo an electrochemical reaction with lithium ions under the potential environment (at the anode potential) where the anode active material 111a stores and releases the lithium ions migrating between the anode active material 111a and the cathode active material 112a. Because the inert metal layer in the anode side 117 does not store and release the lithium ions even if the all-solid-state battery 110 is operated, the inert metal layer in the anode side 117 does not increase the irreversible capacity and no volumetric change accompanied with the occlusion and release of the lithium ions occurs therein. The all-solid-state battery 110 that is structured as described makes it possible to keep the anode 111 and the anode collector 114 adhering to each other for a long time via the metal layer in the anode side 116 and the inert metal layer in the anode side 117. As a result, a state where the lithium ions easily migrate between the anode 111 and the cathode 112 can be kept.

In constituting the metal layer in the cathode side 118 does not undergo an electrochemical reaction with lithium ions under the potential environment (at the cathode potential) where the cathode active material 112*a* stores and releases the lithium ions. Because the metal layer in the cathode side 118 does not store and release the lithium ions even if the all-solid-state battery 110 is operated, the metal layer in the cathode side 118 does not increase the irreversible capacity and no volumetric change accompanied with the occlusion and release of the lithium ions occurs therein. In addition, In foil is soft metal. The all-solid-state battery 110 that is structured as described makes it possible to keep the cathode 112 and the cathode collector 115 adhering to each other for a long time via the metal layer in the cathode side 118. As a result, a state where the lithium ions easily migrate between the anode 111 and the cathode 112 can be kept.

As described above, the all-solid-state battery 110 holds down the increase of the irreversible capacity and makes it possible to keep the state where the lithium ions easily migrate between the anode 111 and the cathode 112 for a long time. Whereby the coulombic efficiency can be improved.

The anode 111 can be made through a process of, for example, pressing an anode mixture that is obtained by mixing the anode active material 111*a* and the sulfide solid electrolyte 113*a* at the predetermined ratio (weight ratio). The cathode 112 can be made through a process of, for example, pressing a cathode mixture that is obtained by mixing the cathode active material 112*a*, the conductive additive 112*b* and the sulfide solid electrolyte 113*a* at the predetermined ratio (weight ratio). The solid electrolyte layer 113 can be made through a process of, for example, pressing the sulfide solid electrolyte 113*a*. After the anode 111, the cathode 112 and the solid electrolyte layer 113 are made as described above, as depicted in FIG. 4, the anode collector 114, the metal layer in the anode side 116, the inert metal layer in the anode side 117, the anode 111, the solid electrolyte layer 113, the cathode 112, the metal layer in the cathode side 118 and the cathode collector 115 are layered under an inert atmosphere (for example, an argon atmosphere, a nitrogen atmosphere or a helium atmosphere) so that they are arranged in this order from one side to the other side, to form a layered body. After that, the all-solid-state battery 110 can be made through a process of, for example, pressing the layered body. When the all-solid-state battery 110 is made, there is especially no limitation in the anode 111, the cathode 112 and the solid electrolyte layer 113 in form. For example, when the all-solid-state battery 110 of small resistance is made, the solid electrolyte layer 113 can be thin. When the all-solid-state battery 110 of high energy density is made, the anode 111 and the cathode 112 can be thick. When the all-solid-state battery 110 of high power density is made, the anode 111 and the cathode 112 can be thin.

Figure 5:
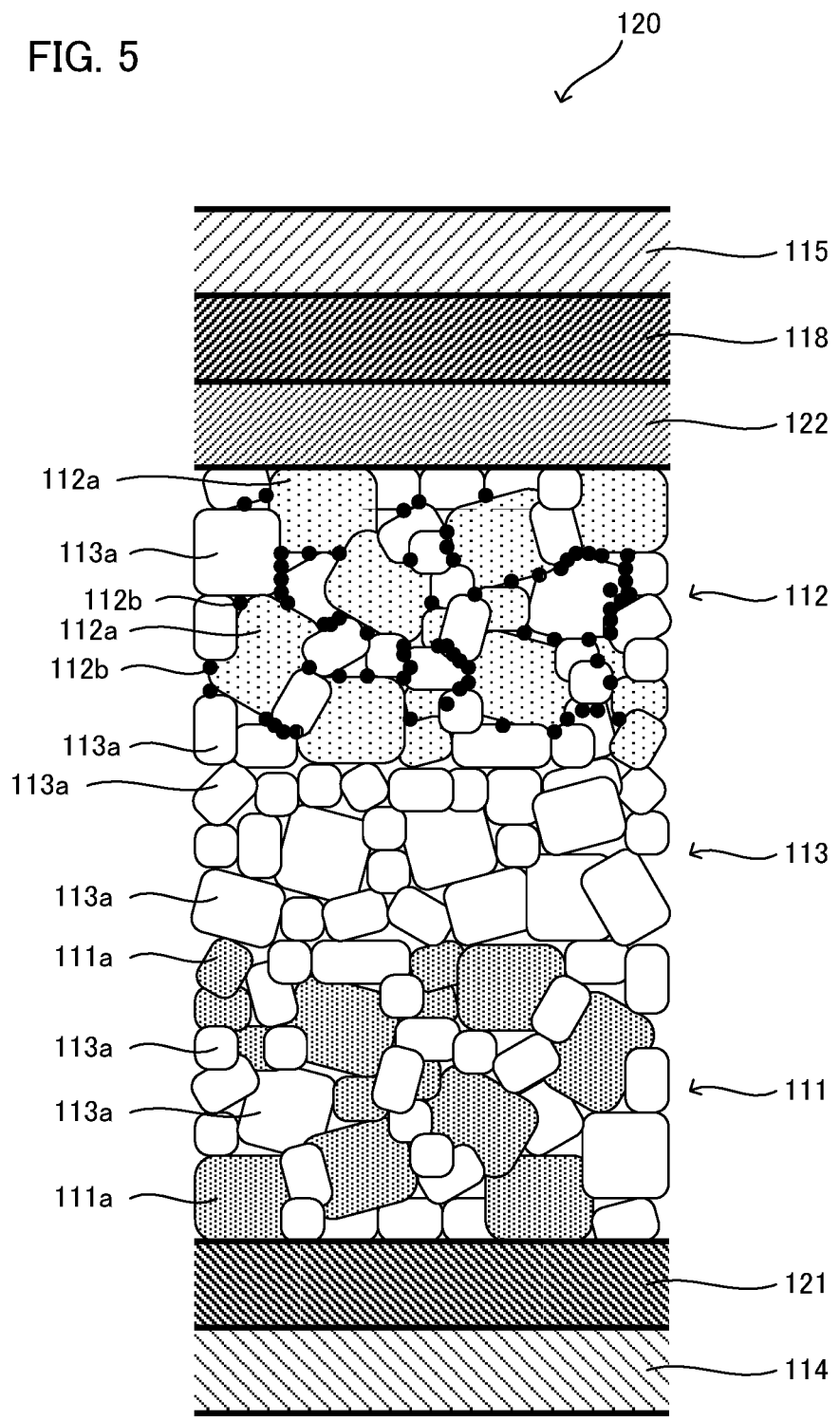
FIG. 5 is a view to explain an example of another structure of the all-solid-state battery of the present invention according to the second embodiment.
Figure 6:
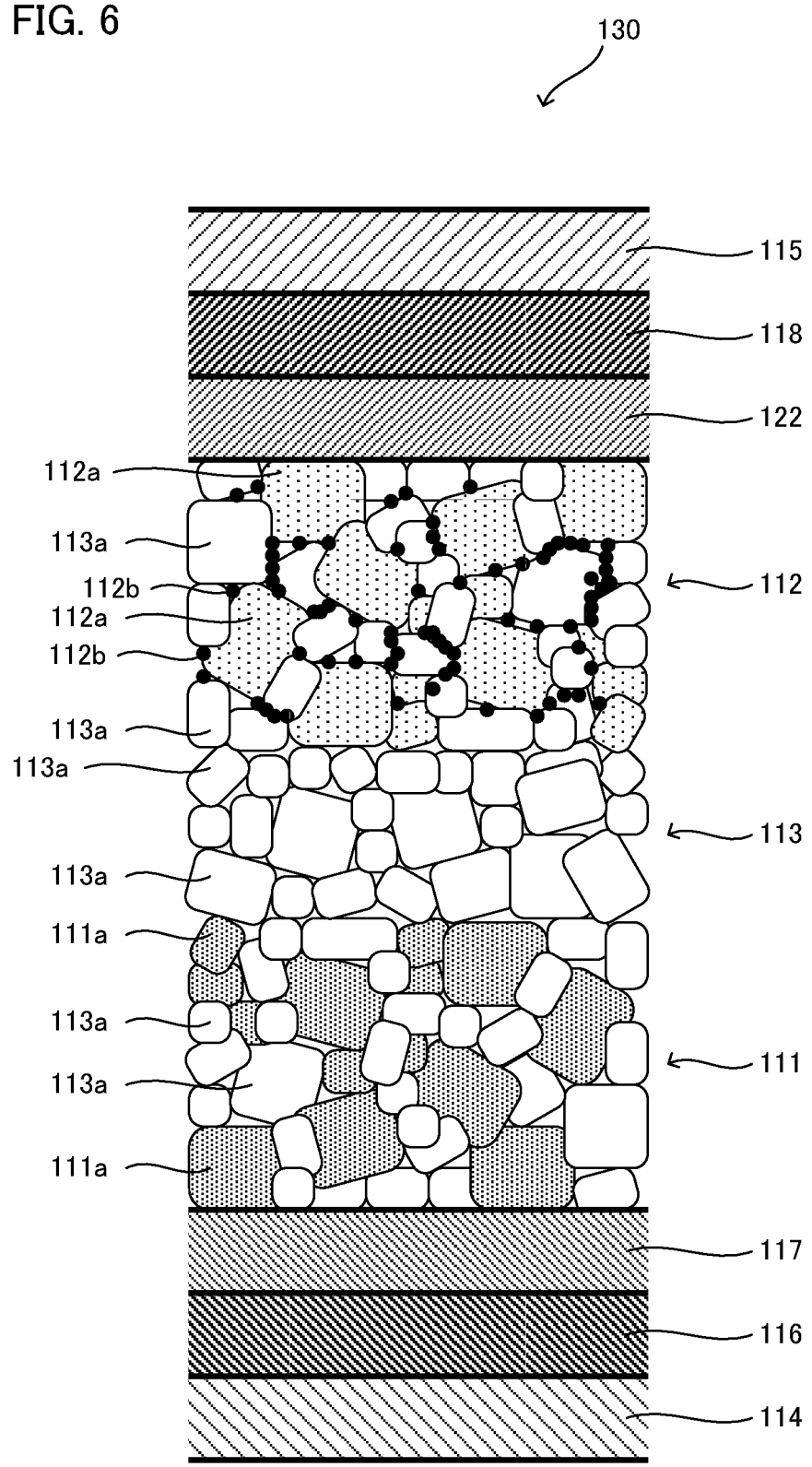
FIG. 6 is a view to explain an example of still another structure of the all-solid-state battery of the present invention according to the second embodiment.

While the above description relating to the all-solid-state battery of the present invention according to the second embodiment illustrates the structure of not arranging an inert metal layer in the cathode side between the cathode 112 and the metal layer in the cathode side 118 although including the inert metal layer in the anode side 117, the all-solid-state battery of the present invention is not limited to this structure. The all-solid-state battery of the present invention according to the second embodiment can have the structure of including an inert metal layer in the cathode side without the inert metal layer in the anode side. In addition, the all-solid-state battery can have the structure of including the inert metal layer in the anode side and the inert metal layer in the cathode side. FIGS. 5 and 6 depict the all-solid-state batteries of these structures.

2.2. All-Solid-State Battery 120

An all-solid-state battery 120 depicted in FIG. 5 is configured as the all-solid-state battery 110 except that a metal layer in the anode side 121 is included therein instead of the metal layer in the anode side 116 without the inert metal layer in the anode side 117, and an inert metal layer in the cathode side 122 is arranged between the cathode 112 and the metal layer in the cathode side 118. That is, the all-solid-state battery 120 includes the anode 111, the cathode 112, the solid electrolyte layer 113 arranged between the anode 111 and cathode 112, the anode collector 114 connected to the anode 111, the cathode collector 115 connected to the cathode 112, the metal layer in the anode side 121 arranged between the anode 111 and the anode collector 114, the metal layer in the cathode side 118 arranged between the cathode 112 and the cathode collector 115, and the inert metal layer in the cathode side 122 arranged between the metal layer in the cathode side 118 and the cathode 112. The anode 111 includes the anode active material 111*a* and the sulfide solid electrolyte 113*a*. The cathode 112 includes the cathode active material 112*a*, the sulfide solid electrolyte 113*a* and the conductive additive 112*b*. The solid electrolyte layer 113 includes the sulfide solid electrolyte 113*a*. In the all-solid-state battery 120, the anode active material 111*a* is graphite, the cathode active material 112*a* is $LiNi_{1/3}Co_{1/3}Mn_{1/3}O_2$, the metal layer in the anode side 121 is Li foil, the metal layer in the cathode side 118 is In foil, and the inert metal layer in the cathode side 122 is Cu foil.

In the all-solid-state battery 120, Li constituting the metal layer in the anode side 121 does not undergo an electrochemical reaction with lithium ions under the potential environment (at the anode potential) where the anode active material 111*a* stores and releases the lithium ions migrating between the anode active material 111*a* and the cathode active material 112*a*. Thus, because the metal layer in the anode side 121 does not store and release the lithium ions even if the all-solid-state battery 120 is operated, the metal layer in the cathode side 121 does not increase the irreversible capacity and no volumetric change accompanied with the occlusion and release of the lithium ions occurs therein. The percent elongation of Li foil is more than 22%. Thus, the all-solid-state battery 120 makes it possible to keep the anode 111 and the anode collector 114 adhering to each other for a long time via the metal layer in the anode side 121. As a result, a state where the lithium ions easily migrate between the anode 111 and the cathode 112 can be kept.

Further, In constituting the metal layer in the cathode side 118 and Cu constituting the inert metal layer in the cathode side 122 do not undergo an electrochemical reaction with lithium ions under the potential environment (at the cathode potential) where the cathode active material 112*a* stores and releases the lithium ions. Because the metal layer in the cathode side 118 and the inert metal layer in the cathode side 122 do not store and release the lithium ions even if the all-solid-state battery 120 is operated, the metal layer in the cathode side 118 and the inert metal layer in the cathode side 122 do not increase the irreversible capacity and no volumetric change accompanied with the occlusion and release of the lithium ions occurs therein. In addition, In foil and Cu foil are soft metal. The all-solid-state battery 120 that is structured as described makes it possible to keep the cathode 112 and the cathode collector 115 adhering to each other for a long time via the metal layer in the cathode side 118 and the inert metal layer in the cathode side 122. As a result, a state where the lithium ions easily migrate between the anode 111 and the cathode 112 can be kept.

As described above, the all-solid-state battery 120 holds down the increase of the irreversible capacity and makes it possible to keep the state where the lithium ions easily migrate between the anode 111 and the cathode 112. Whereby the coulombic efficiency can be improved.

2.3. All-Solid-State Battery 130

An all-solid-state battery 130 depicted in FIG. 6 is configured as the all-solid-state battery 120 except that the metal layer in the anode side 116 is included instead of the metal layer in the anode side 121 and the inert metal layer in the anode side 117 is also included between the metal layer in the anode side 116 and the anode 111. That is, the all-solid-state battery 130 includes the anode 111, the cathode 112, the solid electrolyte layer 113 arranged between the anode 111 and cathode 112, the anode collector 114 connected to the anode 111, the cathode collector 115 connected to the cathode 112, the metal layer in the anode side 116 arranged between the anode 111 and the anode collector 114, the inert metal layer in the anode side 117 arranged between the metal layer in the anode side 116 and the anode 111, the metal layer in the cathode side 118 arranged between the cathode 112 and the cathode collector 115, and the inert metal layer in the cathode side 122 arranged between the metal layer in the cathode side 118 and the cathode 112. The anode 111 includes the anode active material 111a and the sulfide solid electrolyte 113a. The cathode 112 includes the cathode active material 112a, the sulfide solid electrolyte 113a and the conductive additive 112b. The solid electrolyte layer 113 includes the sulfide solid electrolyte 113a. In the all-solid-state battery 130, the anode active material 111a is graphite, the cathode active material 112a is $LiNi_{1/3}Co_{1/3}Mn_{1/3}O_2$, the metal layer in the anode side 116 is In foil, the inert metal layer in the anode side 117 is Cu foil, the metal layer in the cathode side 118 is In foil, and the inert metal layer in the cathode side 122 is Cu foil.

The all-solid-state battery 130 has the same structure as the all-solid-state battery 110 from the anode 111 to the anode collector 114, and as the all-solid-state battery 120 from the cathode 112 to the cathode collector 115. The all-solid-state battery 130 that is structured as described holds down the increase of the irreversible capacity and makes it possible to keep the anode 111 and the anode collector 114 adhering to each other for a long time via the metal layer in the anode side 116 and the inert metal layer in the anode side 117. Thus, a state where lithium ions easily migrate between the anode 111 and the cathode 112 can be kept. In addition, because the all-solid-state battery 130 holds down the increase of the irreversible capacity and makes it possible to keep the cathode 112 and the cathode collector 115 adhering to each other for a long time via the metal layer in the cathode side 118 and the inert metal layer in the cathode side 122, a state where lithium ions easily migrate between the anode 111 and the cathode 112 can be kept. Therefore, the all-solid-state battery 130 holds down the increase of the irreversible capacity and makes it possible to keep the state where lithium ions easily migrate between the anode 111 and the cathode 112. Whereby the coulombic efficiency can be improved.

As described above, both the structure of having one selected from the inert metal layer in the anode side and the inert metal layer in the cathode side, and the structure of having all of two can also make it possible to provide the all-solid-state battery with which the coulombic efficiency can be improved.

2.4. Anode, Anode Collector, Cathode, Cathode Collector and Solid Electrolyte Layer In the present invention according to the second embodiment, the anode, the anode collector, the cathode, the cathode collector and the solid electrolyte layer can have the same structure as the anode, the anode collector, the cathode, the cathode collector and the solid electrolyte layer in the present invention according to the first embodiment described above.

2.5. Metal Layer in Anode Side and Metal Layer in Cathode Side

In the present invention according to the second embodiment, the metal layer in the anode side and the metal layer in the cathode side only have to include metal whose percent elongation is no less than 22%. Examples of such metal include Li, In, Zn, Al, Yb, Cd, Gd, Ca, Au, Ag, Cr, Sm, Dy, Zr, Sn, Ce, Tl, W, Ta, Ti, Fe, Tb, Cu, Th, Pb, Nb, Ni, Nd, Pt, V, Hf, Pd, Pr, Pm, Mn, Mo, La and Re. Alkali metal such as Li is known as soft metal, and can be included in the examples as well.

2.6. Inert Metal Layer in Anode Side

In the present invention according to the second embodiment, metal that does not undergo an electrochemical reaction with metal ions at the anode potential can be used as the inert metal layer in the anode side. Metal that does not undergo an electrochemical reaction with metal ions at the anode potential can be selected according to the anode active material. For example, when the anode active material is graphite, examples of metal usable for the inert metal layer in the anode side include Li, Cu, Au, Ti, Fe, Nb and Ni. In addition, for example, when the anode active material is $Li_4Ti_5O_{12}$, examples of metal usable for the inert metal layer in the anode side include Li, Cu, Au, Ti, Fe, Nb, Ni, In, Zn, Al, Ca, Ag, Zr, Sn and Pt.

2.7. Inert Metal Layer in Cathode Side

In the present invention according to the second embodiment, metal that does not undergo an electrochemical reaction with metal ions at the cathode potential can be used as the inert metal layer in the cathode side. Metal that does not undergo an electrochemical reaction with metal ions at the cathode potential can be selected according to the cathode active material. For example, when the cathode active material is $LiCoO_2$ or $LiNi_{1/3}Co_{1/3}Mn_{1/3}O_2$, examples of metal usable for the inert metal layer in the cathode side include Li, In, Zn, Al, Ca, Zr, Sn, W, Ti, Fe, Nb, Ni, V, Pd, Mn and Mo.

3. Supplementals

While depiction is omitted about the above description concerning the present invention according to the first and second embodiments, the all-solid-state battery of the present invention can be used in a state of being housed in a known exterior that is usable for all-solid-state batteries. Examples of such an exterior include a known laminated film and a metallic housing.

The structure that the all-solid-state battery is a lithium-ion secondary battery is illustrated in the above description concerning the present invention according to the first and second embodiments. However, the present invention is not limited to this structure. The all-solid-state battery of the present invention may have the structure that ions other than lithium ions migrate between the anode and the cathode. Examples of such an ion include a sodium ion and a potassium ion. In a case of the structure that ions other than lithium ions migrate, the anode active material, the cathode active material and solid electrolyte may be properly selected according to migrating ions. Metal used for the metal layer in the anode side and the inert metal layer in the anode side may be selected according to the selected anode active material. Metal used for the metal layer in the cathode side and the inert metal layer in the cathode side may be selected according to the selected cathode active material.

In the present invention, for example, percent elongation can be "percent elongation (%)" specified in JIS Z2241. For example, "metal whose percent elongation is no less than 22%" can be metal selected from the group consisting of In and metal softer than In.

EXAMPLES

1. First Embodiment

[Making Samples]

Embodiment 1

Cathode Mixture

A ternary transition metal layered cathode active material, $LiNi_{1/3}Co_{1/3}Mn_{1/3}O_2$ (manufactured by Nichia Corporation, average particle size ($D_{50}$)=4 to 6 μm) was used as the cathode active material. An $LiNbO_3$ layer (covering layer) of 10 nm in thickness was formed on a surface of the cathode active material with a tumbling fluidized coating machine (MP-01, manufactured by Powrex Corporation).

The cathode active material where the covering layer was formed, a sulfide solid electrolyte ($30LiI·70$ ($0.07Li_2O·0.68Li_2S·0.25P_2S_5$ glass)) and a conductive additive (vapor grown carbon fiber) were mixed so as to have the proportion of: cathode active material where the covering layer was formed:sulfide solid electrolyte:conductive additive=73:24:3 in weight ratio, to obtain a cathode mixture.

Anode Mixture

Natural graphite (manufactured by Mitsubishi Chemical Corporation, average particle size ($D_{50}$)=10 μm) was used as the anode active material. This natural graphite and a sulfide solid electrolyte ($30LiI·70(0.07Li_2O·0.68Li_2S·0.25P_2S_5$ glass)) were mixed so as to have the proportion of: natural graphite:sulfide solid electrolyte=50:50 in weight ratio, to obtain an anode mixture.

Solid Electrolyte

Starting materials were LiI (manufactured by Aldrich, 99.9% purity), $Li_2O$ (manufactured by Kojundo Chemical Laboratory Co., Ltd., 99% purity), $Li_2S$ (manufactured by Nippon Chemical Industries Co., Ltd., 99.9% purity) and $P_2S_5$ (manufactured by Aldrich, 99% purity). They were weighed so as to have the composition ratio (molar ratio) of $30LiI·70(0.07Li_2O·0.68Li_2S·0.25P_2S_5)$. The weighed LiI, $Li_2S$ and $P_2S_5$ were mixed, to obtain a mixture. Next, this mixture was put into a container of a planetary ball mill (made from $ZrO_2$). After dry heptane (manufactured by Kanto Chemical Co., Inc.) was put, and further, $ZrO_2$ balls were put thereinto, the container was completely sealed (Ar atmosphere). This container was attached to a planetary ball mill machine (P7 manufactured by Fritsch), and mechanical milling was carried out at 500 rpm in the disk revolution speed for one hour and was suspended for 15 minutes. This cycle was repeated twenty times. After that, the above described weighed $Li_2O$ was put into the above container of the planetary ball mill, to completely seal the container (Ar atmosphere). This container was attached to the planetary ball mill machine (P7 manufactured by Fritsch), and mechanical milling was carried out at 500 rpm in the disk revolution speed for one hour and was suspended for 15 minutes. This cycle was repeated twenty times. Then, the obtained sample was dried so that heptane was removed therefrom, and whereby a glassy sulfide solid electrolyte was obtained. The composition of the obtained sulfide solid electrolyte was $30LiI·70(0.07Li_2O·0.68Li_2S·0.25P_2S_5)$. Here, after the ball-milling was carried out on LiI, $Li_2S$ and $P_2S_5$, $Li_2O$ was added and the other ball-milling was carried out. For example, it was possible to carry out mechanical milling on a mixture that was made by mixing all of the weighed starting materials for one hour and suspend the mechanical milling for 15 minutes, and repeat this cycle forty times, to make the glassy sulfide solid electrolyte.

Collector

Stainless steel (SUS) was used for the anode collector and the cathode collector.

Metal Layer

In foil (manufactured by The Nilaco Corporation, 100 μm in thickness) and Li foil (manufactured by The Honjo Chemical Corporation, 250 μm in thickness) were used.

Container

A well-closed container made of glass was used. The inside of the container was under the atmosphere of dry Ar.

Making All-Solid-State Battery

The sulfide solid electrolyte ($30LiI·70$ ($0.07Li_2O·0.68Li_2S·0.25P_2S_5$)) of 80 mg was put into a cylinder made from Macor, and pressing was carried out at 98 MPa. Then, the cathode mixture of 17.8 mg was put on the sulfide solid electrolyte in the cylinder, and after that, pressing was carried out at 98 MPa, to make the cathode. Next, the anode mixture of 15.0 mg was put on the sulfide solid electrolyte in the cylinder (a side where the cathode was not arranged), and after that, pressing was carried out at 392 MPa, to make the anode. Next, In foil was put over the surface of the cathode in the cylinder, the cathode collector made from SUS was further put over the surface of the In foil, Li foil was put over the surface of the anode in the cylinder, the anode collector made from SUS was further put over the surface of the Li foil, and after that, pressing was carried out at 98 MPa, to make a layered body having the same structure as the all-solid-state battery 10 depicted in FIG. 1. This layered body was housed in the well-closed container made of glass, which was under the atmosphere of dry Ar, whereby an all-solid-state battery of Example 1 was made. Pressurization by fastening with a bolt or the like was not carried out at all after that.

Example 2

An all-solid-state battery of Example 2 was made as well as Example 1 except that Li foil was each arranged between the anode and the anode collector, and between the cathode and the cathode collector. No pressurization by fastening with a bolt or the like was carried out on the all-solid-state battery of Example 2 after that as well.

Example 3

Anode Mixture $Li_4Ti_5O_{12}$ was used as the anode active material. This $Li_4Ti_5O_{12}$, the sulfide solid electrolyte ($30LiI·70$ ($0.07Li_2O·0.68Li_2S·0.25P_2S_5$ glass)) and the conductive additive (acetylene black, manufactured by Denki Kagaku Kogyo Kabushiki Kaisha) were mixed so as to have the proportion of: $Li_4Ti_5O_{12}$:sulfide solid electrolyte:conductive additive=27:64:9 in weight ratio, to obtain an anode mixture.

Next, the cathode was formed on the sulfide solid electrolyte in the cylinder as well as Example 1 except that the cathode mixture of 12 mg was used. The obtained anode mixture of 25 mg was put on the sulfide solid electrolyte in the cylinder (a side where the cathode was not arranged), and after that, pressing was carried out at 392 MPa, to make the anode. Further, an all-solid-state battery of Example 3 was made as well as Example 1 except that In foil was each arranged between the anode and the anode collector, and between the cathode and the cathode collector (more specifically, as well as Example 1 except the anode mixture and the usage thereof, the cathode mixture and the usage thereof, and the structure that In foil was arranged in each of the anode side and the cathode side). No pressurization by fastening with a bolt or the like was carried out on the all-solid-state battery of Example 3 after that as well.

Reference Example

An all-solid-state battery of Reference Example was made as well as Example 1 except that In foil was each arranged between the anode and the anode collector, and between the cathode and the cathode collector. No pressurization by fastening with a bolt or the like was carried out on the all-solid-state battery of Reference Example after that as well.

[Charge/Discharge Measurements]

CC charge/discharge measurements were carried out on the obtained all-solid-state batteries at 25° C. Conditions for the charge/discharge measurements are represented in Table 1.

TABLE 1

|  | Current Density [mA/cm$^2$] | Potential Range [V] |
| --- | --- | --- |
| Example 1 | 0.2 | 3.0 to 4.37 |
| Example 2 | 0.2 | 3.0 to 4.1 |
| Example 3 | 0.1 | 1.5 to 2.6 |
| Reference Example | 0.2 | 3.0 to 4.1 |

[Results]

Figure 7:
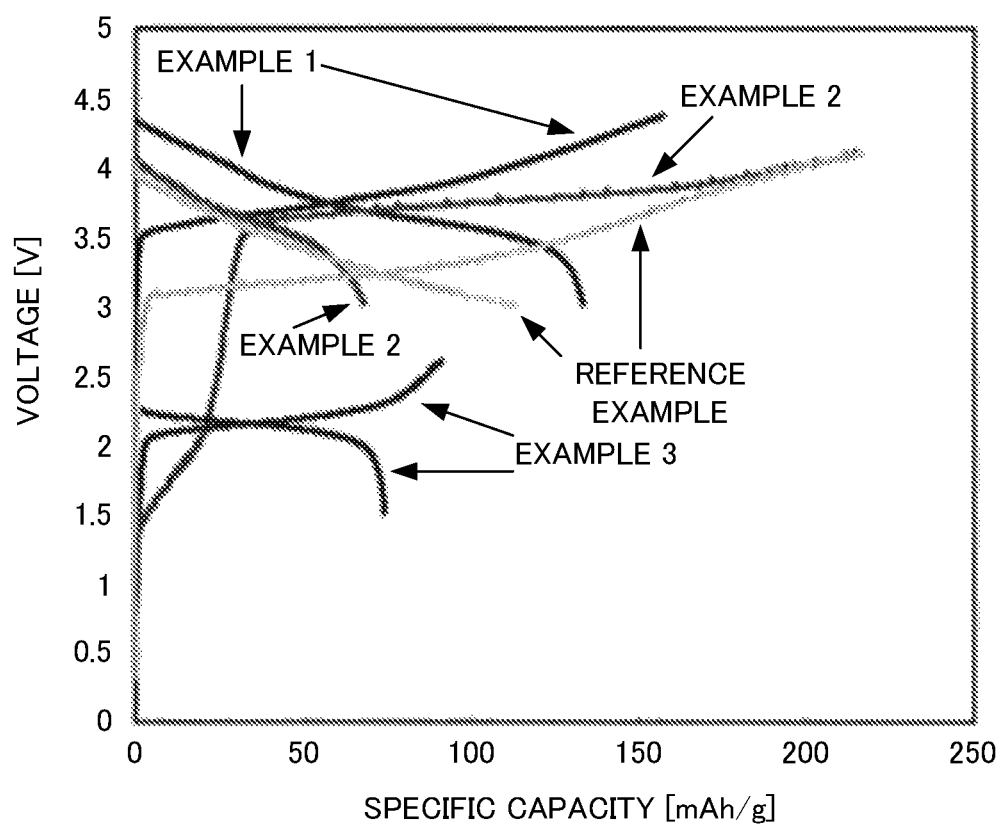
FIG. 7 is a view to explain charge/discharge curves at the first cycle.

FIG. 7 depicts charge/discharge curves at the first cycle. As depicted in FIG. 7, concerning the all-solid-state battery of Example 1, a charge plateau was confirmed at approximately 3.7 V that was a potential difference between the potential of the ternary transition metal layered cathode active material (cathode potential) and the potential of natural graphite (anode potential). Concerning the all-solid-state battery of Example 2, a charge plateau was confirmed at approximately 3.7 V that was the potential difference between the potential of the ternary transition metal layered cathode active material (cathode potential) and the potential of natural graphite (anode potential) while uncertain charge capacity was observed at around 2 V in charging. It was supposed that the reaction observed at around 2 V was caused by the reaction of the cathode active material and Li. Concerning the all-solid-state battery of Example 3, a charge plateau was confirmed at approximately 2.2 V that was a potential difference between the potential of the ternary transition metal layered cathode active material (cathode potential) and the potential of $Li_4Ti_5O_{12}$ (anode potential).

In contrast, concerning the all-solid-state battery of Reference Example, a charge plateau was confirmed at approximately 3.2 V that was not approximately 3.7 V, which was the potential difference between the potential of the ternary transition metal layered cathode active material (cathode potential) and the potential of natural graphite (anode potential). It was considered that because the reaction potential of In was higher than that of natural graphite by approximately 0.5 V, the In foil that was arranged between the anode and the anode collector contributed to the charging reaction in the all-solid-state battery of Reference Example.

Figure 8:
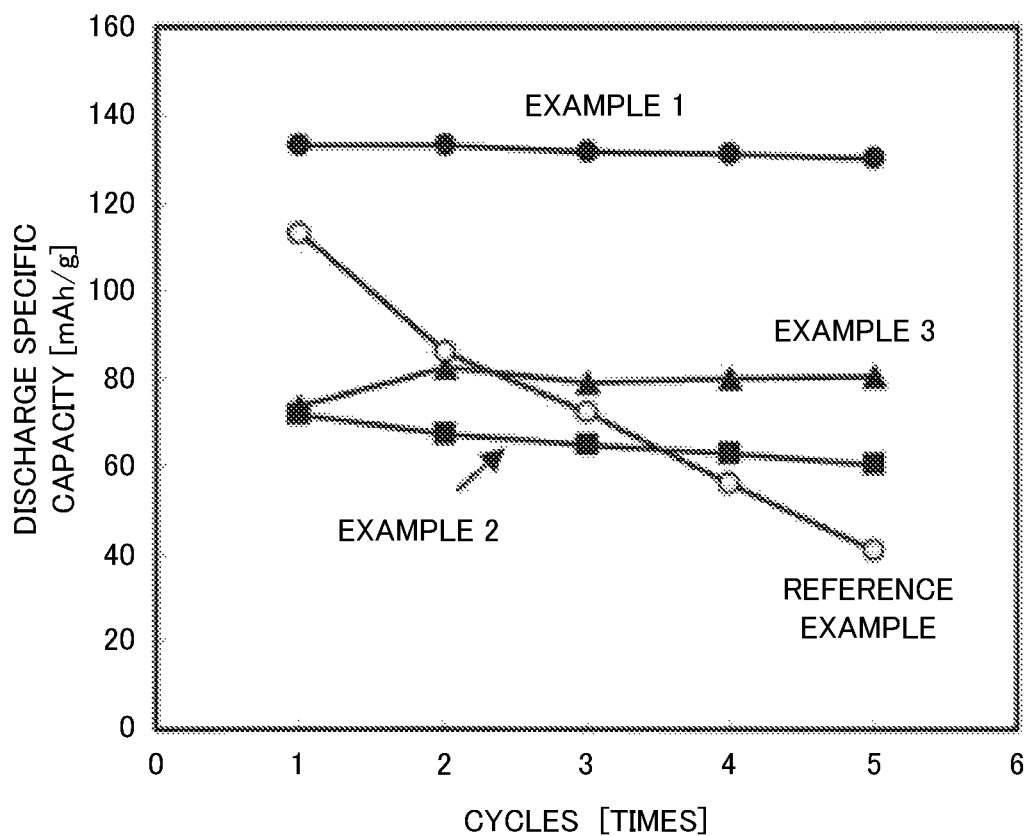
FIG. 8 is a view to explain the cycling properties of discharge specific capacity.

FIG. 8 depicts the cycling properties of discharge specific capacity. Concerning the all-solid-state batteries of the Examples 1 to 3, which used the metal layers in the anode sides that did not undergo an electrochemical reaction with lithium ions at the anode potential, no large capacity decrease was observed since the first cycle till the fifth cycle. In contrast, concerning the all-solid-state battery of the Reference Example, which used the metal layer in the anode side that undergoes an electrochemical reaction with lithium ions at the anode potential, large capacity decrease was observed since the first cycle till the fifth cycle.

Figure 9:
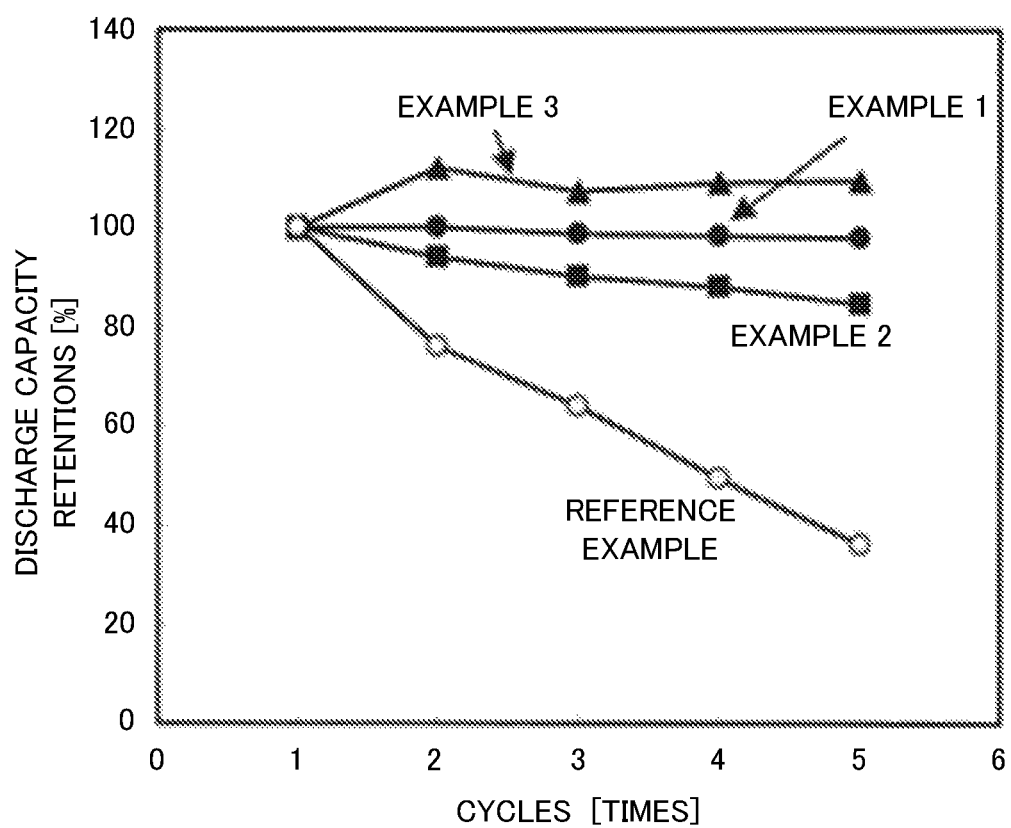
FIG. 9 is a view to explain the discharge capacity retention during charge/discharge cycles.

FIG. 9 depicts the discharge capacity retention during charge/discharge cycles. Here, if the discharge specific capacity at the first cycle was D1 and the discharge specific capacity at the Xth cycle was DX (X≥1), the discharge capacity retention D (%) was able to be obtained from D=100×DX/D1. As depicted in FIG. 9, concerning the all-solid-state batteries of Examples 1 to 3, which used the metal layers in the anode sides that did not undergo an electrochemical reaction with lithium ions at the anode potential, no large change was observed in the discharge capacity retention since the first cycle till the fifth cycle. In contrast, concerning the all-solid-state battery of Reference Example, which used the metal layer in the anode side that undergoes an electrochemical reaction with lithium ions at the anode potential, the discharge capacity retention largely decreased since the first cycle till the fifth cycle. The discharge capacity retention of each all-solid-state battery at the fifth cycle was as follows: the all-solid-state battery of Example 1: 98%; the all-solid-state battery of Example 2: 84%; and the all-solid-state battery of Example 3: 110% while the discharge capacity retention of the all-solid-state battery of Reference Example was 36%.

As described above, it was confirmed that according to the present invention of the first embodiment, it was possible to provide the all-solid-state battery with which the cycling properties were able to be improved. The all-solid-state batteries of Examples 1 to 3 presented good cycling properties although pressurization by fastening with a bolt or the like was not carried out at all. From these results, it was confirmed that the all-solid-state battery of the present invention according to the first embodiment made it possible to exhibit good charge/discharge cycling properties even if the all-solid-state battery was not constrained when used.

2. Second Embodiment

Making Samples

Example 4

Cathode Mixture
The cathode mixture same as Examples 1 to 3 was used.
Anode Mixture
The anode mixture same as Examples 1 to 3 was used.
Solid Electrolyte
The solid electrolyte same as Examples 1 to 3 was used.
Collector The anode collector and the cathode collector same as Examples 1 to 3 were used.

Metal Layer in Anode Side and Metal Layer in Cathode Side

In foil (manufactured by The Nilaco Corporation, 100 μm in thickness) was used for both of them.

Inert Metal Layer in Anode Side

Cu foil (15 μm in thickness) was used.

Container

A well-closed container made of glass was used. The inside of the container was under the atmosphere of dry Ar.

Making All-Solid-State Battery

The sulfide solid electrolyte ($30LiI.70(0.07Li_2O.0.68Li_2S.0.25P_2S_5)$) of 80 mg was put into a cylinder made from Macor, and pressing was carried out at 98 MPa. Then, the cathode mixture of 17.8 mg was put on the sulfide solid electrolyte in the cylinder, and after that, pressing was carried out at 98 MPa, to make the cathode. Next, the anode mixture of 15.0 mg was put on the sulfide solid electrolyte in the cylinder (a side where the cathode was not arranged), and after that, pressing was carried out at 392 MPa, to make the anode. Next, In foil was put over the surface of the cathode in the cylinder, and the cathode collector made from SUS was further put over the surface of the In foil. Cu foil was put over the surface of the anode in the cylinder, and In foil was further put over the surface of the Cu foil, and then, the anode collector made from SUS was further put over the surface of the In foil. After that, pressing was carried out at 98 MPa, to make a layered body having the same structure as the all-solid-state battery 10 depicted in FIG. 1. This layered body was housed in the well-closed container made of glass, which was under the atmosphere of dry Ar, whereby an all-solid-state battery of Example 4 was made. Pressurization by fastening with a bolt or the like was not carried out at all after that.

Comparative Example

An all-solid-state battery of Comparative Example was made as well as Example 4 except that Cu foil was not used in the anode side. No pressurization by fastening with a bolt or the like was carried out on the all-solid-state battery of Comparative Example after that as well.

[Charge/Discharge Measurements]

CC charge/discharge measurements were carried out on the all-solid-state battery of Example 4 and the all-solid-state battery of Comparative Example at 25° C. The potential of the all-solid-state battery of Example 4 was within the range of 3.0 and 4.37 V and the potential of the all-solid-state battery of Comparative Example was within the range of 3.0 and 4.1 V.

[Results]

Figure 10:
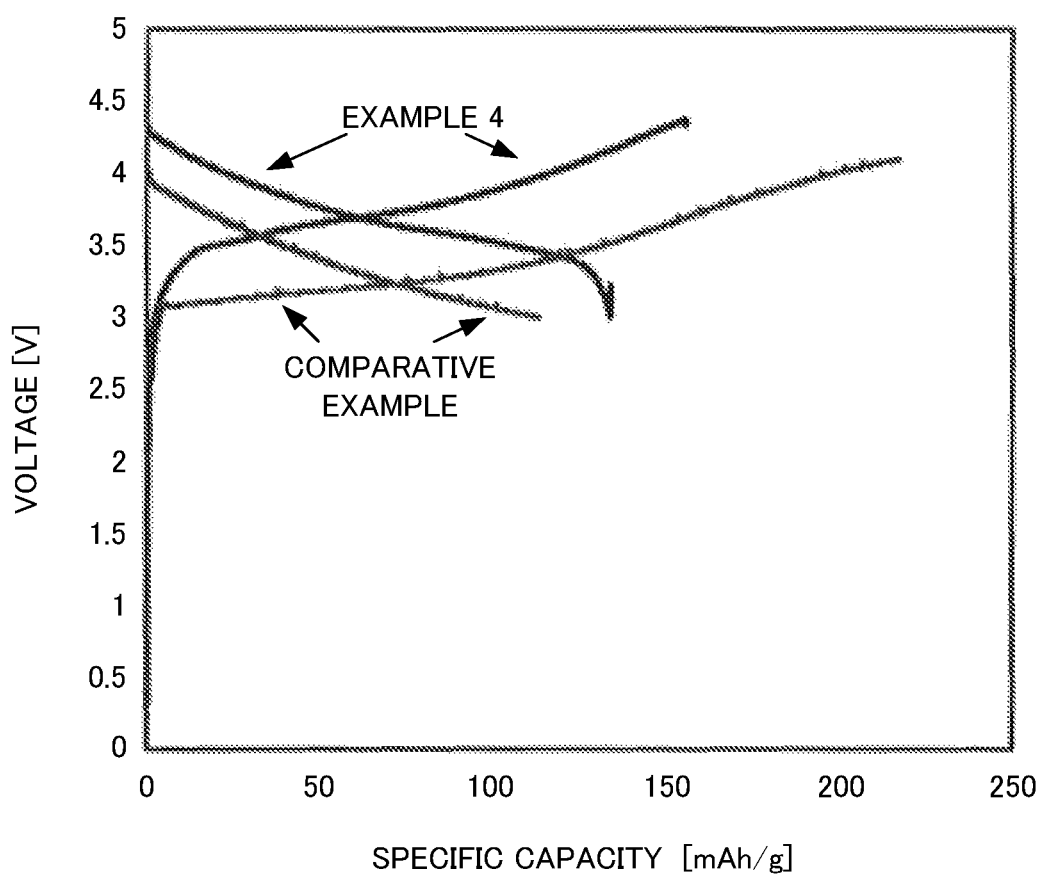
FIG. 10 is a view to explain charge/discharge curves at the first cycle.

FIG. 10 depicts charge/discharge curves at the first cycle. As depicted in FIG. 10, concerning the all-solid-state battery of Example 4, a charge plateau was confirmed at approximately 3.7 V that was a potential difference between the potential of a ternary transition metal layered cathode active material (cathode potential) and the potential of natural graphite (anode potential). In contrast, concerning the all-solid-state battery of Comparative Example, a charge plateau was confirmed at approximately 3.1 V that was not approximately 3.7 V, which was the potential difference between the potential of the ternary transition metal layered cathode active material (cathode potential) and the potential of natural graphite (anode potential). It was considered that because the reaction potential of In was higher than that of natural graphite by approximately 0.5 V, not natural graphite and the ternary transition metal layered cathode active material, but In and the ternary transition metal layered cathode active material underwent a charge discharge reaction in the all-solid-state battery of Comparative Example.

Figure 11:
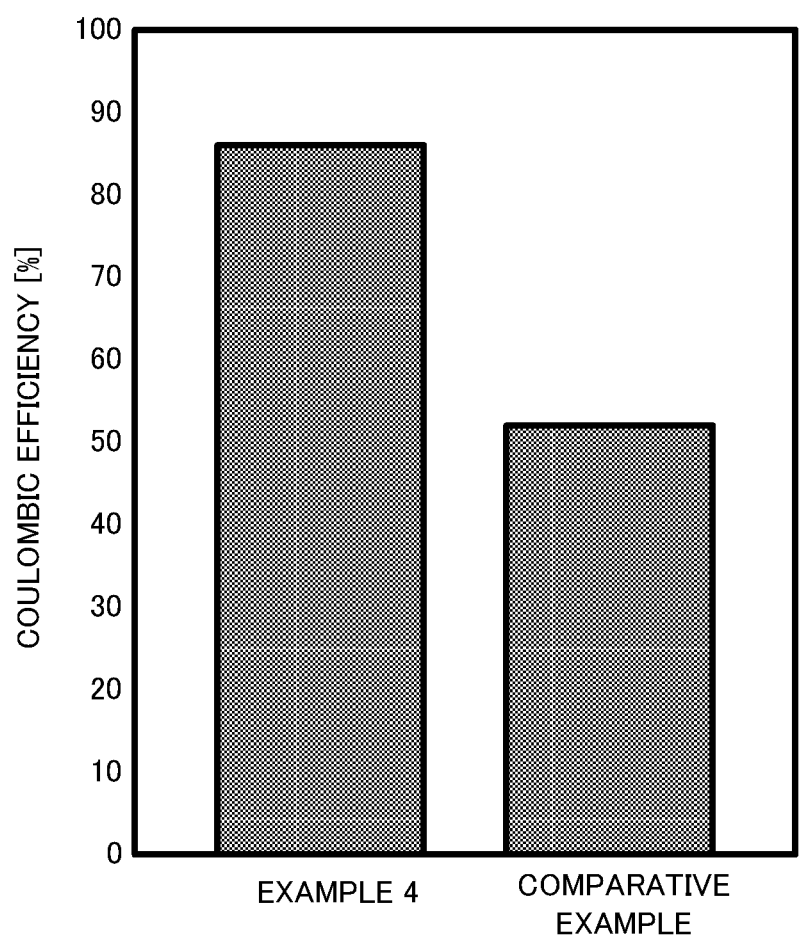
FIG. 11 is a view to explain the coulombic efficiency at the first cycle.

Table 2 represents the charge/discharge specific capacity and the coulombic efficiency at the first cycle. FIG. 11 depicts the coulombic efficiency at the first cycle.

TABLE 2

|  | Charge Specific Capacity [mAh/g] | Discharge Specific Capacity [mAh/g] | Coulombic Efficiency [%] |
| --- | --- | --- | --- |
| Example 4 | 155 | 134 | 86 |
| Comparative Example | 217 | 113 | 52 |

As represented in Table 2 and depicted in FIG. 11, the all-solid-state battery of Example 4 exhibited the high coulombic efficiency of 86%. On the contrary, the all-solid-state battery of Comparative Example had the low coulombic efficiency of 52%. In addition, the all-solid-state battery of Comparative Example had a larger charge specific capacity than the all-solid-state battery of Example 4. Thus, it was considered that In contributed to the charging reaction in the all-solid-state battery of Comparative Example. In contrary, it was considered that the coulombic efficiency was able to be improved in the all-solid-state battery of Example 4, where the Cu foil was arranged between the anode and the In foil, as a result of the prevention of the charge discharge reaction of In with the arrangement of the Cu foil, to hold down the volumetric change of the In foil.

As described above, it was confirmed that according to the present invention of the second embodiment, it was possible to provide the all-solid-state battery with which the coulombic efficiency was able to be improved. The all-solid-state battery of Example 4 presented good coulombic efficiency although pressurization by fastening with a bolt or the like was not carried out at all. From these results, it was confirmed that the all-solid-state battery of the present invention according to the second embodiment made it possible to exhibit good charge/discharge properties even if the all-solid-state battery was not constrained when used.

REFERENCE SIGNS LIST

10, 20, 30 . . . all-solid-state battery
11 . . . anode
11a . . . anode active material
12 . . . cathode
12a . . . cathode active material
12b . . . conductive additive
13 . . . solid electrolyte layer
13a . . . sulfide solid electrolyte
14 . . . anode collector
15 . . . cathode collector
16 . . . metal layer in the anode side (metal layer)
17 . . . metal layer in the cathode side (metal layer)
110, 120, 130 . . . all-solid-state battery
111 . . . anode
111a . . . anode active material
112 . . . cathode
112a . . . cathode active material
112b . . . conductive additive
113 . . . solid electrolyte layer
113a . . . sulfide solid electrolyte
114 . . . anode collector 115 . . . cathode collector
116 . . . metal layer in the anode side (metal layer)
117 . . . inert metal layer in the anode side
118 . . . metal layer in the cathode side (metal layer)
121 . . . metal layer in the anode side (metal layer)
122 . . . inert metal layer in the cathode side

The invention claimed is:

1. An all-solid-state battery comprising:
   an anode that includes an anode active material;
   a cathode that includes a cathode active material;
   a solid electrolyte layer that is arranged between the anode and the cathode;
   an anode collector that is connected to the anode; and
   a cathode collector that is connected to the cathode,
   wherein a metal layer is arranged between the anode and the anode collector and/or between the cathode and the cathode collector,
   in a case where the metal layer is a metal layer in an anode side which is arranged between the anode and the anode collector, the metal layer in the anode side contains metal whose percent elongation is no less than 22%, and an inert metal layer in the anode side is arranged between the metal layer in the anode side and the anode,
   metal that does not undergo an electrochemical reaction with metal ions under a potential environment where the anode active material stores and releases the metal ions is used for the inert metal layer in the anode side,
   the anode collector contains a metal, which metal is different from a metal of the metal layer whose percent elongation is no less than 22%, and is different from a metal of the inert metal layer, and which metals in the metal layer whose percent elongation is no less than 22% and in the inert metal layer are different from each other, and
   the metal whose percent elongation is no less than 22% is selected from the group consisting of In and metals softer than In,
   in a case where the metal layer is a metal layer in a cathode side which is arranged between the cathode and the cathode collector, the metal layer in the cathode side contains metal whose percent elongation is no less than 22%, and an inert metal layer in the cathode side is arranged between the metal layer in the cathode side and the cathode,
   metal that does not undergo an electrochemical reaction with metal ions under a potential environment where the cathode active material stores and releases the metal ions is used for the inert metal layer in the cathode side,
   the cathode collector contains a metal, which metal is different from a metal of the metal layer whose percent elongation is no less than 22%, and is different from a metal of the inert metal layer, and which metals in the metal layer whose percent elongation is no less than 22% and in the inert metal layer are different from each other, and
   the metal whose percent elongation is no less than 22% is selected from the group consisting of In and metals softer than In.

2. The all-solid-state battery according to claim 1, wherein
   the anode active material is graphite, and the inert metal layer in an anode side includes metal selected from Li, Cu, Au, Ti, Fe, Nb and Ni.

3. The all-solid-state battery according to claim 1, wherein
   the cathode active material is $LiCoO_2$ or $LiNi_{1/3}Co_{1/3}Mn_{1/3}O_2$, and the inert metal layer in a cathode side includes metal selected from Li, In, Zn, Al, Ca, Zr, Sn, W, Ti, Fe, Nb, Ni, V, Pd, Mn and Mo.

4. The all-solid-state battery according to claim 2, wherein
   the cathode active material is $LiCoO_2$ or $LiNi_{1/3}Co_{1/3}Mn_{1/3}O_2$, and the inert metal layer in a cathode side includes metal selected from Li, In, Zn, Al, Ca, Zr, Sn, W, Ti, Fe, Nb, Ni, V, Pd, Mn and Mo.

5. The all-solid-state battery according to claim 1, wherein
   the metal whose percent elongation is no less than 22% is In, and the metal of the inert metal layer is Cu, for the cathode side only, for the anode side only, or for both the cathode side and the anode side.

* * * * *